US012677350B2

(12) United States Patent
Chandrashekar et al.

(10) Patent No.: US 12,677,350 B2
(45) Date of Patent: Jul. 7, 2026

(54) CELL DTX/DRX INTERWORKING WITH LAYER1/LAYER2 TRIGGERED MOBILITY

(71) Applicant: Rakuten Symphony, Inc., Tokyo (JP)

(72) Inventors: Subramanya Chandrashekar, Karnataka (IN); Vihang Kamble, Weybridge (GB); Sridhar Bhaskaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 302 days.

(21) Appl. No.: 18/691,112

(22) PCT Filed: Dec. 19, 2023

(86) PCT No.: PCT/US2023/084966
§ 371 (c)(1),
(2) Date: Mar. 12, 2024

(87) PCT Pub. No.: WO2025/029315
PCT Pub. Date: Feb. 6, 2025

(65) Prior Publication Data
US 2025/0234422 A1      Jul. 17, 2025

(30) Foreign Application Priority Data
Aug. 3, 2023    (IN) .............................. 202341052152

(51) Int. Cl.
*H04W 76/28*        (2018.01)
*H04W 24/02*        (2009.01)
*H04W 36/00*        (2009.01)
(52) U.S. Cl.
CPC ........... *H04W 76/28* (2018.02); *H04W 24/02* (2013.01); *H04W 36/0085* (2018.08)

(58) Field of Classification Search
None
See application file for complete search history.

(56) References Cited

U.S. PATENT DOCUMENTS

| | | | | |
|---|---|---|---|---|
| 2024/0147328 A1* | 5/2024 | Kim | ...................... | H04W 36/30 |
| 2025/0071648 A1* | 2/2025 | Hong | ................ | H04W 36/0058 |
| 2026/0040213 A1* | 2/2026 | Cheng | ............... | H04W 52/0219 |

FOREIGN PATENT DOCUMENTS

WO        2023/128726 A1      7/2023

OTHER PUBLICATIONS

Shan Jaffry, "Configuring Connected-mode Discontinuous Reception (C-DRX) in 5G ORAN system.", Medium, Mar. 25, 2023 (8 pages) https://syedshan85.medium.com/configuring-connected-mode-discontinuous-reception-c-drx-in-5g-oran-system-8c2063cde661.

(Continued)

*Primary Examiner* — Hong S Cho
(74) *Attorney, Agent, or Firm* — Sughrue Mion, PLLC

(57) ABSTRACT

Example embodiments of the present disclosure relate to Cell Discontinuous Transmission (DTX)/Discontinuous Reception (DRX) interworking with Layer 1/Layer 2 (L1/L2) Triggered Mobility (LTM). According to embodiments, a system may include a serving distributed unit (DU). The serving DU may be configured to: add at least one LTM-specific active duration to at least one Cell DTX/DRX cycle associated with a serving cell; provide, to at least one user equipment (UE), information of the at least one added active duration; and provide, to the at least one UE during the at least one added active duration, a Media Access Control (MAC) Control Element (CE). The MAC CE may include a cell switch command that instructs the UE to perform an LTM cell switch from the serving cell to a target cell.

20 Claims, 14 Drawing Sheets

(56)          References Cited

OTHER PUBLICATIONS

Huawei, "(TP for L1L2Mob BLCR for TS 38.401 and TS 38.473): Continuation on LTM procedure design", 3GPP TSG-RAN WG3 Meeting #120, Incheon, KR, May 22-26, 2023, R3-232825 (21 pages).

* cited by examiner

CELL DTX/DRX INTERWORKING WITH LAYER1/LAYER2 TRIGGERED MOBILITY

CROSS REFERENCE TO RELATED APPLICATION

This application is a National Stage of International Application No. PCT/US2023/084966 filed Dec. 19, 2023, claiming priority based on Indian Provisional Patent Application No. 202341052152, filed with the Indian Patent Office on Aug. 3, 2023, and entitled "A SYSTEM AND METHOD FOR CELL DTX/DRX INTERWORKING WITH LAYER1/LAYER2 TRIGGERED MOBILITY", the disclosure of which is incorporated herein by reference in its entirety.

TECHNICAL FIELD

Example embodiments of the present disclosure relate to Cell Discontinuous Transmission (DTX)/Discontinuous Reception (DRX) interworking with Layer 1/Layer 2 (L1/L2) Triggered Mobility (LTM).

BACKGROUND

In order to enhance the performance of a telecommunication network, various features and mechanisms have been introduced. Among others, one or more technical specifications provided by 3rd Generation Partnership Project (3GPP) standard organization (e.g., Release 18, etc.) have described mechanisms and procedures for Layer 1/Layer 2 (L1/L2) Triggered Mobility (LTM) to reduce mobility latency. Further, one or more 3GPP technical specifications (e.g., Release 18, etc.) have also described the concepts and mechanisms for Cell Discontinuous Transmission (DTX)/Discontinuous Reception (DRX) for network energy saving. A cell that is serving a user equipment (UE) may be configured with Cell DTX/DRX for energy-saving purposes, while the UE may be configured with LTM to reduce mobility latency.

SUMMARY

Example embodiments of the present disclosure provide systems, apparatuses, methods, and the like, that facilitate Cell DTX/DRX interworking with LTM.

According to embodiments, a system may include a serving distributed unit (DU). The serving DU may be configured to: add at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell; provide, to at least one user equipment (UE), information of the at least one added active duration; and provide, to the at least one UE during the at least one added active duration, a Media Access Control (MAC) Control Element (CE). The MAC CE may include a cell switch command that instructs the at least one UE to perform an LTM cell switch from the serving cell to a target cell.

According to embodiments, a method may include: adding at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell; providing, to at least one user equipment (UE), information of the at least one added active duration; and providing, to the at least one UE during the at least one added active duration, a Media Access Control (MAC) Control Element (CE). The MAC CE may include a cell switch command that instructs the at least one UE to perform an LTM cell switch from the serving cell to a target cell.

According to embodiments, a non-transitory computer-readable recording medium may have recorded thereon instructions executable by at least one network node to cause the at least one network node to perform a method. The method may include: adding at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell; providing, to at least one user equipment (UE), information of the at least one added active duration; and providing, to the at least one UE during the at least one added active duration, a Media Access Control (MAC) Control Element (CE). The MAC CE may include a cell switch command that instructs the UE to perform an LTM cell switch from the serving cell to a target cell.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
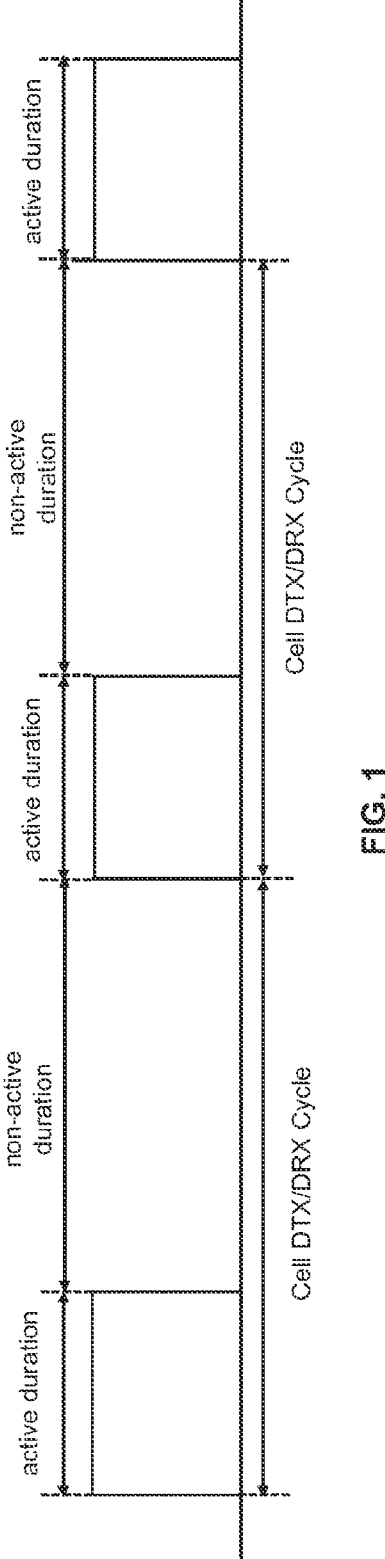
FIG. 1 illustrates a diagram of example Cell DTX/DRX cycles.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise forms disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limited to the described implementations. Thus, the operation and behavior of the systems and/or methods are described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]", are to be understood as including only A, only B, or both A and B.

It shall be noted that, descriptions of example embodiments of the present disclosure may include terms and names defined in one or more standard organizations, such as the 3rd Generation Partnership Project (3GPP) standard organization, the European Telecommunications Standards Institute (ETSI) standard organization, and the like. For instance, the terms "Cell DTX/DRX", "LTM cell switch", "MAC CE", "PDCCH", "RRC Reconfiguration message", "F1AP UE Context Modification Required message", "UE Context Modification procedure", "DCI", "RNTI", "F1 interface", "RRC Reconfiguration Acknowledge message", and the like, as well as the associated features and operations, are to be interpreted as consistent with those specified in one or more 3GPP technical specifications and the like, unless being described otherwise.

Further, although some embodiments of the present disclosure may be described herein with reference to "gNodeB" of 5G system and the associated components, it can be understood that the scope of the present disclosure should not be limited thereto. Specifically, example embodiments of the present disclosure may also apply to any suitable network elements in any suitable telecommunication system, such as a 4G LTE system, a 6G system, and the like.

In addition, although it is described herein that a central unit (CU) may communicate with a user equipment (UE), it can be understood that such descriptions do not necessarily restrict that the CU is directly connecting or communicating with the UE. Rather, it is contemplated that the CU may communicate with the UE via any suitable channel or element, such via as a distributed unit (DU), a network cell, and the like, without departing from the scope of the present disclosure. Similarly, although it is described herein that DU may communicate with the UE, it can be understood that such descriptions do not necessarily restrict that the DU is directly connecting or communicating with the UE, due to a similar reason.

Furthermore, the terms "Cell DTX/DRX" are intended to specify that the "DTX/DRX" is associated with a network cell. In this regard, it is contemplated that although some example embodiments may be described herein with reference to "Cell DTX/DRX", said example embodiments may be similarly applied to only "Cell DTX" or only "Cell DRX", without departing from the scope of the present disclosure. For instance, it is described in some embodiments that one or more active durations can be added to one or more Cell DTX/DRX cycles, it can be understood that one or more active durations can be added to only one or more Cell DTX cycles or only one or more Cell DRX cycles.

With the evolvement in telecommunication network technologies, network elements in a telecommunication network may be disaggregated into multiple entities. Specifically, a disaggregated architecture, defined in one or more 3GPP technical specifications, is disaggregating a base station into multiple logical entities. For instance, a gNodeB (gNB) may be disaggregated into a Central Unit (CU) and a Distributed Unit (DU). Likewise, a single CU may be disaggregated into a CU-Control Plane (CU-CP) and a CU-User Plane (CU-UP).

The CU-CP may host the Radio Resource Control (RRC) layer and PDCP-c, and the CU-UP may host the Service Data Adaptation Protocol (SDAP) layer and PDCP-u. In this regard, PDCP-c may refer to a first mode of the Packet Data Convergence Protocol (PDCP) layer that primarily handles control plane data, and PDCP-u may refer to a second mode of the PDCP layer that primarily handles user plane data. On the other hand, a single DU may host or serve multiple network cells, a Radio Link Control (RLC) layer, a Media Access Control (MAC) layer, and a Physical (PHY) layer. The scheduling operation may take place at the DU.

The concepts and basic principles of Layer 1/Layer 2 (L1/L2)-Triggered Mobility (LTM) have been introduced in one or more 3GPP technical specifications (e.g., Release-18). Generally, LTM is a procedure in which a base station (e.g., gNB) receives one or more L1 measurements (e.g., in the form of one or more L1 measurement reports, etc.) from a UE, and triggers a cell switch procedure based on the received L1 measurement(s). Specifically, the base station may change the UE's serving cell by signaling, to the UE, a Media Access Control (MAC) Control Element (CE) that includes a cell switch command. Accordingly, the UE may switch from the serving cell to a target cell according to the cell switch command.

By way of example, when a UE is configured with LTM, the UE may continuously monitor one or more RRM parameters (e.g., radio signal quality, signal strength, etc.) of one or more nearby candidate cells and/or the serving cell. Accordingly, the UE may report one or more L1 measurements to the serving cell (or a base station associated therewith), and the serving cell (or the base station associated therewith) may evaluate, based on the one or more L1 measurements, whether or not one or more cell switch criteria have been satisfied. For instance, the serving cell (or the base station associated therewith) may determine, based on one or more RRM parameters in the one or more L1 measurements, whether or not the signal quality of the serving cell is deteriorating or whether or not a neighboring candidate cell offers a better signal quality. Based on determining that one or more cell switch criteria have been satisfied, the serving cell (or the base station associated therewith) may send, to the UE, a MAC CE including a cell switch command, instructing the UE to perform an LTM cell switch from the serving cell to the target cell.

To this end, the LTM enables a cell switch via L1/L2 signaling, without involving or affecting the upper layers (e.g., Layer 3, etc.). Further, LTM leverages L1 measurement(s) to trigger or initiate an optimized cell switch procedure, thereby facilitating seamless cell switch and mobility management for a UE when the UE moves between different cells or access points in the telecommunication network.

On the other hand, the mechanisms and procedures for Cell Discontinuous Transmission (DTX)/Discontinuous Reception (DRX) have also been described in one or more 3GPP technical specifications (e.g., Release 18, etc.). Generally, Cell DTX/DRX is designed to optimize the power consumption of a network cell by allowing the network cell to periodically enter sleep mode and wake-up mode according to pre-defined cycles.

By configuring a cell with Cell DTX/DRX, the cell can enter into sleep mode for a period of time, and then wake up to transmit and/or receive data thereafter. Specifically, when the cell is configured with Cell DTX/DRX, the cell can get into sleep mode for a period of time and then wake up again to transmit/receive data (if any), which in turn effectively reduces the power consumption of the cell. The cell configured with Cell DTX/DRX may periodically repeat the entering of sleep mode and wake-up mode, and a cycle of such phenomena may be referred to as a "Cell DTX/DRX cycle".

FIG. 1 illustrates a diagram of examples of the Cell DTX/DRX cycle. As illustrated in FIG. 1, a DRX cycle may define the periodic repetition of an "active duration" followed by a "non-active duration". The x-axis of the diagram may define the length of the Cell DTX/DRX cycles (e.g., in ms, etc.), while the y-axis of the diagram may define the level of power consumption when the cell turns on during the active duration. The Cell DTX/DRX pattern or configuration (e.g., length of Cell DTX/DRX cycle, length of active duration, etc.) may be defined and adjustable by an operator of the network.

During the "active duration", a cell configured with the Cell DTX/DRX can be turned on and then enter the wake-up mode. Conversely, during the "non-active duration", the cell can be turned off and then enter the sleep mode. Thus, in some implementations, an "active duration" may also be referred to as an "on-duration", and a "non-active duration" may also be referred to as an "off-duration". Further, in some implementations, a device (e.g., a user equipment, etc.) may be provided or configured with a Cell DTX/DRX pattern. When Cell DTX is configured and activated for a cell, the device does not monitor the physical downlink control channel (PDCCH) and/or the Semi-Persistent Scheduling (SPS) occasions during the Cell DTX non-active duration. Conversely, when Cell DRX is configured and activated for the cell, the UE does not transmit on configured grant (CG) resources or a scheduling request (SR) during the Cell DRX non-active duration. Thus, the "active duration" of a Cell DTX/DRX cycle may refer to a duration that the device (e.g., UE) waits for to receive data from the cell (e.g., PDCCH and/or SPS occasions, etc.), and transmit SR or CG. The active duration and cycle parameters may be common between Cell DTX and Cell DRX, when both the Cell DTX and Cell DRX are configured or activated. During the "active duration", the transmission/reception of PDCCH, SPS, CG, Scheduling Request (SR), periodic and semi-persistent CSI report, and the like, are not impacted for the purpose of network energy saving.

During the "non-active duration", the cell configured with Cell DTX/DRX can enter into the wake-up mode (e.g., with the RF module turned on, etc.) and can determine whether or not there is any data for transmission and/or reception. If the cell detects data for transmission and/or reception, the cell may stay awake and start the data transmission and/or reception. On the other hand, if the cell does not detect any data for transmission and/or reception within the active duration, the cell may enter into sleep mode during the non-active duration. In some implementations, during the non-active duration, instead of disabling all transmission/reception, the cell may disable particular transmission/reception, thereby providing limited transmission/reception. For example, the cell may be configured such that no transmission and/or reception of particular periodic signals and/or channels (e.g., common channels/signals, UE-specific signals/channels, etc.) is enabled during the non-active duration. Ultimately, configuring a cell with Cell DTX/DRX enables the cell to conserve power consumption.

In view of the above, a base station (e.g., gNB) may configure a cell with Cell DTX/DRX and may provide LTM configuration to a UE such that the UE may be configured with LTM, thereby enhancing the performance of the cell and the UE. Nevertheless, in the related art, there are several shortcomings when the cell that is serving the UE (may be referred to as a "serving cell" herein) is configured with Cell DTX/DRX and the UE is configured with the LTM.

First, as described above, an LTM-configured UE is required to send one or more L1 measurements to the associated base station, in order to trigger an LTM cell switch. In this regard, if the Cell DRX is activated at the serving cell (to which the UE is connected), the serving cell cannot receive the L1 measurement(s) from the UE during the non-active duration of the Cell DRX cycle(s). Similarly, the UE can only send the L1 measurement(s) during the active duration of the Cell DRX cycle(s) of the serving cell. Accordingly, the LTM cell switch cannot be timely triggered when required.

Further, as described above, the base station is required to provide an LTM cell switch command to the UE, such that the UE can execute the LTM cell switch based thereon. In this regard, the base station can only send the LTM cell switch command to the UE during the active duration of the Cell DTX cycle(s). In other words, when the base station determines that an LTM cell switch is required, but the serving cell is inactive/in sleep mode, the base station would not be able to immediately send the MAC CE (that includes the LTM cell switch command) to the associated UE until the serving cell wakes up in the next active duration. Accordingly, delaying the transmission/reception of the LTM cell switch command may result in a delay in the LTM cell switch, thereby causing a Radio Link Failure (RLF). Further, the delay in the base station sending the LTM cell switch command is against the objective of LTM, since LTM is expected to provide a fast cell switch procedure as compared to a baseline Layer 3 (L3) handover, and the base station is supposed to send the LTM cell switch command as soon as possible.

In addition to the shortcomings described above, the mechanism for supporting Cell DTX/DRX and LTM in the disaggregated architecture remains unclear and unspecified at the present time. For instance, it is unclear how the entities in a disaggregated gNB (e.g., gNB-CU, gNB-DU, etc.) operate to enable proper execution of LTM when a serving cell is configured with Cell DTX/DRX.

In this regard, example embodiments of the present disclosure provide a system architecture, mechanism, procedure, and the like, for facilitating Cell DTX/DRX interworking with LTM, thereby enabling proper execution of LTM when a serving cell is configured with DTX/DRX.

Specifically, example embodiments of the present disclosure provide a system, a method, a device, and the like, that enable a base station (e.g., a DU) to timely provide an LTM cell switch command to one or more UEs, and enable the one or more UEs to timely receive the LTM cell switch command to perform LTM cell switch based thereon, regardless of the initial Cell DTX/DRX configuration of the serving cell. Ultimately, the LTM cell switch command may be timely provided to the one or more UEs, thereby avoiding any delay in the LTM cell switch and mitigating the risk of RLF due to the delayed LTM cell switch.

Further, example embodiments of the present disclosure provide a system, a method, a device, and the like, that enable the one or more UE to timely provide one or more L1 measurements to the base station (e.g., the DU), and enable the base station to timely receive the one or more L1 measurements. Accordingly, the one or more L1 measurements may be timely provided to the base station and the LTM cell switch may be timely triggered.

Furthermore, operations associated with the configuration of cells may take place at the CU, while the execution of the cell switch may take place autonomously at the DU without further interaction with the upper layers. Accordingly, example embodiments of the present disclosure provide a system architecture, mechanism, procedure, and the like, for facilitating Cell DTX/DRX interworking with LTM in the disaggregated architecture, thereby enabling effective interworking between a serving cell configured with Cell DTX/DRX and one or more UEs configured with LTM, in the disaggregated architecture.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations, as well as the technical advantages associated therewith, of example embodiments of the present disclosure are provided below.

General System Architecture

Figure 2:
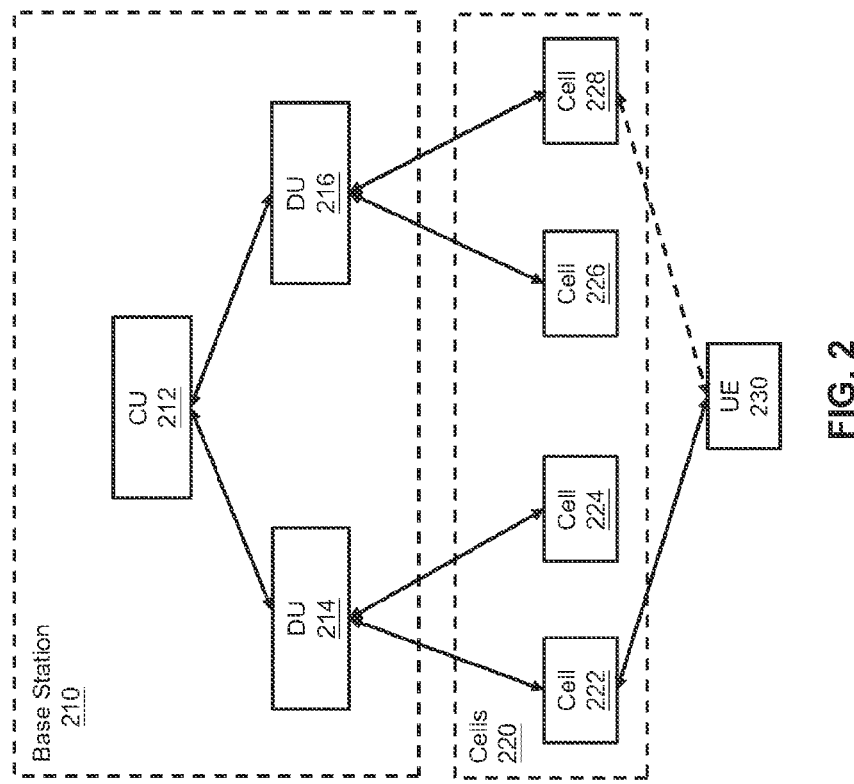
FIG. 2 illustrates a block diagram of a generic system architecture in which one or more example embodiments may be implemented.

FIG. 2 illustrates a block diagram of a generic system architecture 200 in which one or more example embodiments may be implemented. As illustrated in FIG. 2, the system architecture 200 may include at least one base station 210, a plurality of cells 220, and at least one user equipment (UE) 230. It is contemplated that the components and configurations illustrated in FIG. 2 are merely examples of possible embodiments of the present disclosure, and the system architecture may include more/fewer components than as illustrated, and/or the components may be arranged in a manner different from as illustrated, without departing from the scope of the present disclosure.

The base station 210 may include at least one central unit (CU) 212 and a plurality of distributed units (DUs) 214-216. According to embodiments, the base station may include a gNodeB (gNB) of 5G NR or a node in Next Generation Radio Access Network (NG-RAN). In this case, the CU 212 may be a gNB-CU, and the DUs 214-216 may be gNB-DUs. It is contemplated that the base station 210 may include any other suitable type of radio base station, such as an Evolved Node B (eNodeB) of a 4G LTE network, a base station of a 6G network, and the like, without departing from the scope of the present disclosure. Further, the communication between the CU 212 and the DUs 214-216 may be performed via an F1 interface.

According to embodiments, the CU 212 and the DUs 214-216 may be defined in software form and may be deployed in one or more network nodes. For instance, the CU 212 and the DUs 214-216 may be deployed in one or more servers in the form of virtualized network function (VNF), containerized and/or cloud-native function (CNF), and the like.

According to embodiments, the CU 212, the DU 214, and/or the DU 216 may be deployed in the same network node (e.g., same server) and/or may be located at a similar geographical location (e.g., be deployed in different servers in the same data center). According to embodiments, the CU 212, the DU 214, and/or the DU 216 may be deployed in different network nodes and/or may be located at different geographical locations. For instance, the CU 212 may be deployed in one or more central servers (i.e., servers in one or more central data centers) further from the UE 230, and the DUs 214-216 may be deployed in one or more edge servers (i.e., servers in one or more edge data centers) nearer to the UE 230. Similarly, the DU 214 and DU 216 may be located at different geographical locations (e.g., be deployed in different servers, etc.).

Descriptions of example network nodes, in which the CU 212 and/or the DUs 214-216 may be deployed, are provided below with reference to FIG. 12 to FIG. 13. Descriptions of an example environment, in which the CU 212 and/or the DUs 214-216 may be deployed, are provided below with reference to FIG. 14. In this regard, it is contemplated that one or more operations associated with the CU 212 and the DUs 214-216 described herein may be performed by one or more components of the associated network node, without departing from the scope of the present disclosure.

The DUs 214-216 may receive radio signals from an end user (via the UE 230 and one or more of the cells 220) and may provide operation or support for lower layers of protocol stacks (e.g., Radio Link Control (RLC) layer, Medium Access Control (MAC) layer, Physical Layer, etc.) accordingly. As an example, the DUs 214-216 may perform one or more scheduling operations. The CU 212 may communicatively couple the DUs 214-216 to a core network (e.g., 4G Evolved Packet Core (EPC) network, 5G Core network, etc.) and may receive the radio signals from the DUs, thereby providing operation or support for higher layers of protocol stacks (e.g., Packet Data Convergence Protocol (PDCP) layer, Radio Resource Control (RRC) layer, etc.) accordingly. As an example, the CU 212 may provide one or more configurations to the UE 230 via RRC signaling.

According to embodiments, a single CU may host or serve multiple DUs. In the example of FIG. 2, the CU 212 may host or serve the DU 214 and the DU 216. It is contemplated that, in practice, a CU may host or serve less or more than two DUs, without departing from the scope of the present disclosure.

Referring still to FIG. 2, the cells 220 may include a plurality of cells 222-228. One or more of the cells 222-228 may include a macro cell, a micro cell, a pico cell, a femto cell, or any other suitable type of network cell. Each of the cells 222-228 may have an associated coverage area, in which at least one radio unit (RU), at least one antenna system, and any other suitable type of transport network element (TNE), may be deployed therein. According to embodiments, one or more of the cells 222-228 may be configured with Cell DRX and/or Cell DTX.

Hereinbelow, a cell to which the UE 230 is connected may be referred to as a "serving cell", and a cell nearby the UE 230 and/or the serving cell may be referred to as a "neighboring cell", a cell that may be selectable (from among one or more neighboring cell) for an LTM cell switch may be referred to as a "candidate cell" or an "LTM candidate cell", and a cell that is selected (from among one or more candidate cells) for undergoing the LTM cell switch may be referred to as a "target cell" or an "LTM target cell". Similarly, a DU that serves or hosts the serving cell may be referred to as a "source DU" or a "serving DU", a DU that serves or hosts the candidate cell may be referred to as a "candidate DU", and a DU that serves or hosts the target cell may be referred to as a "target DU". A target cell/DU can be understood to be a candidate cell/DU that has been selected for LTM cell switch. One or more of the DUs may include an NG-RAN node DU.

According to embodiments, a single DU may host or serve multiple cells. For example, the DU may implement various radio technologies, such as Massive Multiple-Input Multiple-Output (MIMO), beamforming, and the like, to optimize radio communication among the multiple cells and the CU. In the example of FIG. 2, the DU 214 may host or serve the cells 222-224, and the DU 216 may host or serve the cells 226-228. Nevertheless, it is contemplated that, in practice, a DU may host or serve less or more than two cells, without departing from the scope of the present disclosure. Specifically, in some implementations, a single DU may concurrently host or serve hundreds (e.g., 512, etc.) of cells at a time.

Referring still to FIG. 2, the UE 230 may include one or more devices that may be utilized by one or more end users to access the telecommunication network. For instance, the UE 230 may include one or more of: a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), a SIM-based device, and any other suitable device. According to embodiments, the UE 230 may include a group of UEs, such as a plurality of devices, apparatuses, equipment, and the like, that are communicatively coupled to the same cell (e.g., serving cell 222).

According to embodiments, the UE 230 may be configured with Connected mode DRX (C-DRX) for device energy saving. In this regard, it is contemplated that the example embodiments of the present disclosure are applicable to both situations in which the UE 230 is and is not configured with C-DRX.

One or more of the cells 222-228 may be configured with Cell DTX/DRX, and the UE 230 may be configured with LTM. The pattern or configuration of the Cell DTX/DRX cycle may be common for a plurality of UEs associated with a cell (e.g., a group of UEs connected to a serving cell, etc.). For instance, when the UE 230 includes a group of UEs, said group of UEs may experience the same/common Cell DTX/DRX cycle of the serving cell 222 since they are hosted or served by the serving cell 222. According to embodiments in which the UE 230 is configured with C-DRX, at least a portion of an on-duration of the DRX cycle associated with the UE 230 may overlap with at least a portion of an active duration of the Cell DTX/DRX cycle associated with the serving cell 222. For instance, the C-DRX periodicity may be a multiple or a factor of the Cell DTX/DRX periodicity, or vice versa.

In operation, the UE 230 may be configured with LTM, and may connect to the serving cell 222 hosted or served by the serving DU 214. Subsequently, the UE 230 may perform an LTM cell switch from the serving cell 222 to another cell when required.

According to embodiments, the UE 230 may perform an intra-DU LTM cell switch, wherein the UE 230 may switch from a serving cell to a target cell that is served or hosted by the same serving DU (e.g., switch from serving cell 222 to cell 224). According to embodiments, the UE 230 may perform an inter-DU LTM cell switch, wherein the UE 230 may switch from a serving cell to a target cell that is served or hosted by a different DU (e.g., switch from serving cell 222 to cell 228). The information of the type of cell switch and the target cell associated therewith are determined by the base station 210. For instance, during an LTM preparation phase, the base station 210 (e.g., CU 212, DU 214, etc.) may select one or more LTM candidate cells from among a plurality of neighboring cells, and then prepare and provide the LTM configuration of the selected LTM candidate cells to the UE 230. Accordingly, during an LTM execution phase, the base station (e.g., DU 214) may select a target cell from among the one or more LTM candidate cells, and then provide information of the target cell to the UE 230 in a cell switch command, such that the UE 230 may perform the cell switch to the target cell based thereon.

An example of an inter-DU cell switch is illustrated in FIG. 2, in which the UE 230 is switching from the cell 222 (i.e., the serving cell) hosted/served by the DU 214 (i.e., the serving DU) to the cell 228 (i.e., the target cell) hosted/served by the DU 216. In this example, the serving cell 222 is assumed to be configured with Cell DTX/DRX. Descriptions of example operations associated therewith are provided in the following.

During the bring-up process (e.g., initialization, activation, etc.), the serving cell 222 is provided (e.g., by the serving DU 214, by the CU 212, etc.) with configuration of Cell DTX/DRX. The configuration associated with Cell DTX/DRX may be referred to as "Cell DTX/DRX configuration" herein. The Cell DTX/DRX configuration may include, for example, periodicity, start slot/offset, configurations of active duration/non-active duration, configuration of Cell DTX/DRX cycles, and the like. It is contemplated that the Cell DTX/DRX may be characterized by one or more of the principles defined in one or more 3GPP specifications (e.g., specification provided by RAN WG2 (RAN2) of 3GPP Technical Specification Group Radio Access Network (TSG RAN), etc.).

The serving cell 222 may apply the Cell DTX/DRX configuration to thereby be configured with the Cell DTX/DRX. For instance, the serving cell 222 may override the default on/off timer or power setting with the Cell DTX/DRX configuration, thereby enabling the Cell DTX/DRX at the serving cell 222. According to embodiments, the pattern or configuration for Cell DTX and Cell DRX may be different. For instance, the pattern of Cell DTX cycle and the pattern of Cell DRX cycle may be different. In this case, the serving cell 222 may configure the Cell DTX cycle and the Cell DRX cycle separately. Conversely, the pattern or configuration for the Cell DTX and the Cell DRX may be common when both are configured. For example, the Cell DTX and the Cell DRX may have the same configuration on active duration, may have common cycle parameters, and the like. The Cell DTX and Cell DRX may be configured and activated separately. According to embodiments, the serving cell 222 may include a plurality of Cell DTX/DRX configurations or patterns. For instance, the serving cell 222 may have two Cell DTX/DRX configurations or patterns, and the like. Further, different cells may have the same or different Cell DTX/DRX configurations or patterns. For instance, the serving cell 222 and the cell 224, which are both hosted or served by the serving DU 214, may have the same/different Cell DTX/DRX configurations or patterns.

When the UE 230 is first connected to the serving cell 222, the base station 210 (e.g., CU 212) may provide (to the UE 230) configurations which, when being utilized by the UE 230, enable the UE 230 to be configured with LTM. The configuration associated with LTM may be referred to as "LTM configuration" herein. The LTM configuration may include, for example, an identity of a cell (e.g., a Cell ID of a candidate cell, a Cell ID of a target cell, etc.), the radio bearer of the cell, measurement configurations (e.g., a measurement gap, type of measurement such as intra-frequency measurement or inter-frequency measurement, etc.), reporting configuration, RRC configuration, and the like.

According to embodiments, the base station 210 (e.g., DU 214) may, based on determining that the UE 230 is configured with LTM, provide information of the Cell DTX/DRX cycle associated with the serving cell (e.g., cell 222) to the UE 230. Accordingly, the UE 230 may align or adjust, based on the information of the Cell DTX/DRC cycle, the periodic L1 measurement(s) and the reporting of the L1 measurement(s) according to the Cell DTX/DRC cycle. In this way, the UE 230 can timely provide the L1 measurement(s) to the serving cell during the active duration of the Cell DTX/DRX cycle, thereby timely and properly triggering the LTM cell switch when required.

Further, when the UE 230 first enters a connected state, the UE 230 may receive, from the base station 210 (e.g., CU 212, etc.), the LTM configuration associated with the serving cell and/or one or more neighboring cells. According to embodiments, the UE 230 may further receive, from the base station (e.g., CU 212), C-DRX configuration associated with the UE 230. The UE 230 may receive the C-DRX configuration in the same/separate message that includes the LTM configuration. According to embodiments, the UE 230 may receive the LTM configuration and/or the C-DRX configuration in one or more Radio Resource Control (RRC) messages, such as one or more RRC Reconfiguration messages. Accordingly, the UE 230 may be configured with the LTM based on the LTM configuration. Further, if the UE 230 has received the C-DRX configuration, the UE 230 may be configured with the C-DRX based on the C-DRX configuration.

According to embodiments, the base station 210 (e.g., CU 212, DU 214) may provide the Cell DTX/DRX configuration (or information associated therewith) to the UE 230. Accordingly, the UE 230 may utilize the Cell DTX/DRX configuration to adjust or perform one or more operations. For instance, the UE 230 may be configured to adjust or align, based on the Cell DTX/DRX configuration, the periodic L1 measurement(s) and reporting of the L1 measurement(s).

Further, the UE 230 may not monitor the PDCCH for dynamic grants/assignments for new transmission during Cell DTX non-active durations, may not monitor SPS occasions during Cell DTX non-active durations, and the like. Further, the UE 230 may not transmit on CG resources or occasions during Cell DRX non-active durations, may not transmit SR occasions during Cell DRX non-active durations, and the like.

The aforesaid features (e.g., not monitoring PDCCH during non-active durations, not transmitting SR during non-active durations, etc.) may only be applicable when the UE 230 is in RRC_CONNECTED state, which may not impact Random Access procedure, synchronization signal block (SSB) transmission, paging, and system information broadcasting. For instance, as soon as the base station 210 recognizes that there is a specific event (e.g., an emergency call, a public safety-related service, Multimedia Priority Service (MPS), Mission Critical Service (MCS), etc.), the base station 210 may release, deactivate, or disable the Cell DTX/DRX at the serving cell 222, to ensure that there is no impact on the associated service.

As another example, if the UE 230 is configured with C-DRX, the UE 230 may utilize the Cell DTX/DRX configuration to adjust the C-DRX configuration, thereby enhancing the performance therefrom. For instance, the UE 230 may align its DRX cycles with the Cell DTX cycles, may omit one or more DRX cycles, may start offsets of DRX, and the like. According to embodiments, the UE 230 may adjust at least one on-duration of the associated DRX cycle to be at least partially overlapping with at least one active duration of the Cell DTX/DRX cycle.

Upon configuring with LTM (and adjusting the associated configuration according to the Cell DTX/DRX configuration, if applicable), the UE 230 may continuously (or periodically) perform one or more measurements on the serving cell 222 and/or one or more neighboring cells (e.g., cells 224-228) and then provide the measurement(s) to the base station 210, such that the base station may determine which of the neighboring cells are suitable to be selected for LTM cell switch. For instance, the UE 230 may perform one or more measurements on Reference Signal Received Power (RSRP) (or other suitable parameters) of the serving cell and/or the neighboring cell(s), and then provide or report the one or more RSRP measurements to the CU 212 via Layer 3 (L3). Thus, a measurement that is reported via L3 can also be referred to as an "L3 measurement". The L3 measurement may include, for example, an SSB-based L3 measurement, a Channel State Information Reference (CSI-RS) based L3 measurement, and the like. Since the L3 measurement may be sent to the CU 212 via RRC reporting (e.g., may be included in an RRC: Measurement Report, etc.), the L3 measurement may also be referred to as an "RRC measurement". Similarly, during the LTM execution phase, the UE 230 may provide the one or more measurements to the serving DU 214 via Layer 1 (L1). In this regard, a measurement which is reported via L1 can also be referred to as an "L1 measurement".

Upon receiving the measurement(s) from the UE 230, the base station 210 (e.g., CU 212) may prepare, based on the measurement(s) provided by the UE 230, one or more candidate cells from among the neighboring cells. Accordingly, the base station 210 may provide the configuration of the candidate cells to the UE 230 via RRC signaling. For instance, the CU 212 may obtain information of cells 224-228 from the DU 214 and DU 216, and then select cells 226-228 as the candidate cells. Accordingly, the CU 212 may provide the configuration of cells 226-228 to the UE 230 via at least one RRC Reconfiguration message.

Subsequently, the UE 230 may continuously (or periodically) perform one or more L1 measurements on the one or more candidate cells and/or the serving cell, and may send the results of the one or more L1 measurements (e.g., in the form of L1 measurement report(s), etc.) to the serving DU 214. The serving DU 214 may determine, based on the one or more L1 measurements provided by the UE 230, whether or not the LTM cell switch is required or is expected (e.g., whether or not any of the candidate cell(s) fulfill a criteria of LTM cell switch and can be selected as the LTM target cell, etc.).

For instance, the serving DU 214 may determine, based on one or more parameters (e.g., RSRP, SINR, etc.) in the L1 measurement(s), whether or not one or more criteria for performing the LTM cell switch (may be referred to as "LTM cell switch criteria" herein) are met, and may determine that the LTM cell switch is required or is expected based on determining that the one or more LTM cell switch criteria are met. According to embodiments, based on determining that the LTM cell switch is not currently required or expected, the serving DU 214 may predict whether or not the LTM cell switch is expected in one or more upcoming Cell DTX/DRX cycles (example embodiments associated therewith are further described below with reference to FIG. 8 to FIG. 10).

In this regard, when the serving DU 214 determines that the LTM cell switch is required or is expected, the serving DU 214 may select one of the candidate cells as the target cell, and may trigger the LTM cell switch procedures by generating and providing an LTM cell switch command to the UE 230. The LTM cell switch command may include the target cell identity and at least some LTM parameter configurations of the target cell. For instance, in the example of FIG. 2, the serving DU 214 may select the cell 228 as the target cell, and may provide LTM configuration of the cell 228 (in the LTM cell switch command) to the UE 230. According to embodiments, the serving DU 214 may provide the LTM cell switch command in a MAC CE.

According to embodiments, the serving DU 214 may determine a primary target cell and provide the LTM cell switch command to the UE 230 for performing a primary LTM cell switch (e.g., a first cell switch). In addition, the DU 214 may determine at least one secondary target cell, and may provide LTM fallback configuration to the UE 230 to enable LTM failure recovery, such that the UE 230 may perform a secondary LTM cell switch (e.g., a second cell switch, a third cell switch, etc.) autonomously without requiring an additional LTM cell switch command from the serving DU 214, when the primary LTM cell switch is unsuccessful. The LTM fallback configuration may include configuration (e.g., LTM configuration, etc.) of the at least one secondary target cell. For instance, in the example of FIG. 2, the DU 214 may select the cell 228 as the primary target cell, and may select the cell 226 as the secondary target cell. Accordingly, the DU 214 may provide the LTM fallback configuration (that includes configuration of the cell 226) to the UE 230, such that the UE 230 may autonomously perform a secondary LTM cell switch from the cell 222 to the cell 226, when the LTM cell switch from the cell 222 to the cell 228 is unsuccessful. The LTM fallback configuration may be provided along with the LTM configuration of the primary target cell in the LTM cell switch command, and may be provided to the UE 230 in one MAC CE. Further descriptions of associated example embodiments are provided below with reference to FIG. 11.

Upon obtaining the LTM cell switch command, the UE 230 may perform, based on the LTM cell switch command, an LTM cell switch from the serving cell to the target cell. For instance, the UE 230 may detach from the serving cell (e.g., cell 222) and may apply the LTM configuration of the target cell (e.g., cell 228). Subsequently, the UE 230 may perform a random access procedure (e.g., Random Access Channel (RACH) procedure, etc.) to connect to the target cell, if the UE 230 has not yet acquired the timing advance (TA) of the target cell earlier. On the other hand, if the UE 230 has acquired the TA of the target cell, the UE 230 may adjust its uplink (UL) transmission according to the TA, thereby connecting to the target cell. Upon successful LTM cell switch, the UE 230 may indicate successful completion of the LTM cell switch towards the target cell and/or the target DU. According to embodiments, the UE 230 may send a UL data packet to the target cell (which act as the new serving cell upon successful LTM cell switch) and/or the associated DU, to indicate a successful LTM cell switch. In some implementations, based on determining that the LTM cell switch is successful, the UE 230 may further provide, to the CU 212, an RRC Reconfiguration Acknowledge message.

According to embodiments, the serving DU 214 may be configured to add at least one active duration to at least one Cell DTX/DRX cycle associated with the serving cell 222. According to embodiments, the serving DU 214 may add a plurality of active durations (e.g., in a plurality of Cell DTX/DRX cycles). Specifically, the serving DU 214 may select an active duration factor from a plurality of predefined active duration factors. Subsequently, the serving DU 214 may add or introduce, based on the selected active duration factor, the plurality of active durations. Descriptions of example operations associated therewith are provided below with reference to FIG. 6A to FIG. 7. According to embodiments, the serving DU 214 may predict an LTM cell switch in an upcoming Cell DTX/DRX cycle, and may add at least one active duration to at least one Cell DTX/DRX cycle that is associated with the predicted LTM cell switch. Descriptions of example operations associated therewith are provided below with reference to FIG. 8 to FIG. 10.

It is contemplated that the length of the additional active duration(s) can be appropriately configured or adjustable by the network operator as per requirement, without departing from the scope of the present disclosure. For instance, in alternative to adding an active duration(s) based on an active duration factor or based on a predicted LTM cell switch, the serving DU 214 may also add more active duration(s) and/or may extend the additional active duration(s), such that the UE may monitor the PDCCH for a longer period.

Accordingly, the serving DU 214 may provide, to the UE 230, information of the at least one added active duration, such that the UE 230 may monitor the PDCCH during the at least one added active duration to timely receive the LTM cell switch command therefrom. Subsequently, the serving DU 214 may provide the LTM cell switch command (in a MAC CE) to the UE 230 during the at least one added active duration.

According to embodiments in which the UE 230 includes a group of UEs, the DU 214 may provide a group MAC CE to the group of UEs. The group MAC CE may include the same information (e.g., information of at least one added active duration, LTM cell switch command, LTM fallback configuration, etc.), and the group MAC CE may be provided to the group of UEs in any suitable sequence. For instance, the group MAC CE may be broadcasted on the PDCCH, and the group of UEs which are monitoring the PDCCH may simultaneously or sequentially obtain the group MAC CE therefrom, by using a common LTM-RNTI.

In view of the above, example embodiments of the present disclosure provide a system architecture, mechanism, procedure, and the like, for facilitating Cell DTX/DRX interworking with LTM, thereby enabling proper execution of LTM cell switch when at least one UE is configured with LTM and the serving cell is configured with Cell DTX/DRX. Specifically, example embodiments of the present disclosure provide a system, a method, a device, and the like, that enable the base station (e.g., DU) to timely provide the LTM cell switch command to the one or more UEs, and the one or more UEs may timely receive the LTM cell switch command from the DU to perform LTM cell switch based thereon, even if the UE(s) is configured with LTM and the serving cell is configured with Cell DTX/DRX.

Further, the base station (e.g., DU) can provide LTM fallback configuration to the UE, thereby ensuring that the UE may autonomously perform a secondary LTM cell switch when a primary LTM cell switch is unsuccessful. Furthermore, operations associated with the configuration of cell(s) may take place at the CU, while the execution of the cell switch may take place autonomously at the DU without further interaction with the upper layers. Ultimately, example embodiments of the present disclosure provide a system architecture and mechanisms for facilitating Cell DTX/DRX interworking with LTM in the disaggregated architecture.

Example Operations for Facilitating Cell DTX/DRX Interworking with LTM

As described above, according to embodiments, a distributed unit (DU) may be configured to add at least one active duration to the Cell DTX/DRX associated with a serving cell, such that the DU may timely provide LTM cell switch command to at least one user equipment (UE), thereby facilitating Cell DTX/DRX interworking with LTM. Descriptions of example embodiments associated therewith are provided below with reference to FIG. 3 to FIG. 5.

Figure 3:
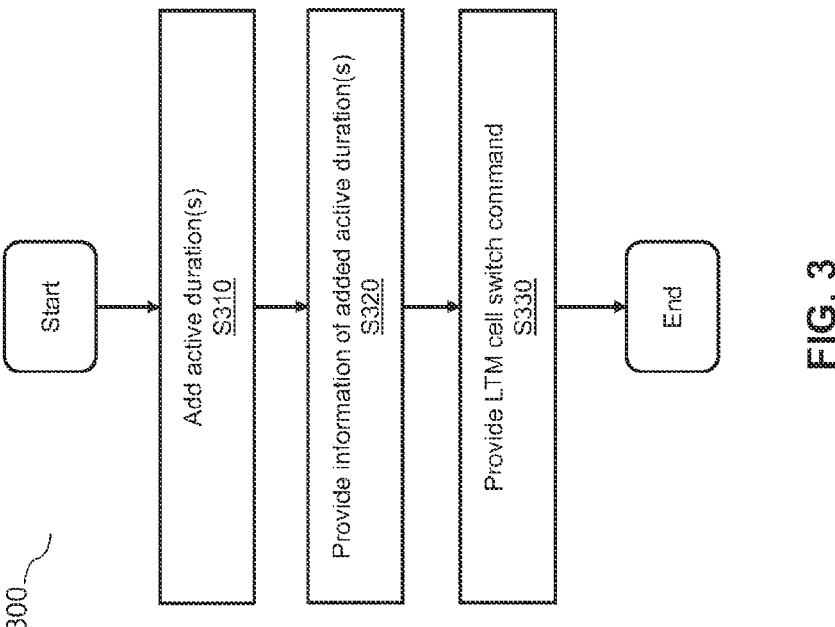
FIG. 3 illustrates a flow diagram of an example method for adding at least one active duration and providing an LTM cell switch command, according to one or more embodiments.

Referring first to FIG. 3, which illustrates operations on the DU side. Specifically, FIG. 3 illustrates a flow diagram of an example method 300 for adding at least one active duration and providing an LTM cell switch command, according to one or more embodiments. One or more operations of method 300 may be performed by a serving DU or a component (e.g., a processor) of a network node in which the serving DU is deployed. According to embodiments, the DU may include a DU associated with a serving NG-RAN node (may be referred to as a "serving NG-RAN node DU" herein).

Referring to FIG. 3, at operation S310, the serving DU may be configured to add at least one active duration to at least one Cell DTX/DRX cycle associated with a serving cell. The serving cell may be hosted or served by the serving DU, and may be communicatively coupled to at least one UE. The added at least one active duration may act as an additional and/or a dedicated LTM cell switch command transmission window in the associated Cell DTX/DRX cycle, at which the serving DU may transmit a MAC CE (that includes an LTM cell switch command) to a UE or transmit a group MAC CE to a group of UEs. Thus, the at least one active duration may also be referred to as an "LTM-specific active duration" herein.

According to embodiments, the serving DU may be configured to add a plurality of active durations to a plurality of Cell DTX/DRX cycles. Specifically, the serving DU may receive at least one L1 measurement from at least one UE, and then predict (based on the at least one L1 measurement) a timing of an LTM cell switch during a non-active duration. Accordingly, the serving DU may select (from a plurality of predefined active duration factors based on the at least one L1 measurement) an active duration factor corresponding to the predicted timing. Subsequently, the serving DU may add or introduce, based on the selected active duration factor, the plurality of active durations. Descriptions of example embodiments associated therewith are provided below with reference to FIG. 6A to FIG. 7.

According to embodiments, the serving DU may predict an LTM cell switch in an upcoming Cell DTX/DRX cycle, and may add at least one active duration to at least one Cell DTX/DRX cycle that is associated with the predicted LTM cell switch. Specifically, the serving DU may be configured to predict a timing at which the LTM cell switch is expected, and then add the at least one active duration to accommodate the timing at which the LTM cell switch is expected and/or to accommodate a timing at which the cell switch command is expected to be transmitted to the at least one UE. Descriptions of example embodiments associated therewith are provided below with reference to FIG. 8 to FIG. 10.

Upon adding the at least one active duration, the method 300 may proceed to operation S320, at which the serving DU may be configured to provide information of the at least one added active duration to at least one UE. The at least one UE may be hosted or served by the serving cell, and may be configured with LTM. The information of the at least one added active duration may include a start time and an end time of the added active duration. The at least one UE may include a plurality of LTM configured UEs.

According to embodiments in which the serving DU has added the at least one active duration based on an active duration factor, the information of the at least one added active duration may further include information of the active duration factor. According to embodiments in which the serving DU has added the at least one active duration based on a predicted LTM cell switch, the information of the at least one added active duration may further include information of the predicted LTM cell switch, such as a timing at which the LTM cell switch is expected, an expected transmission time of the LTM cell switch command, and the like.

According to embodiments, the serving DU may be configured to provide the information of the at least one added active duration via a MAC CE (descriptions of example embodiments associated therewith are provided below with reference to FIG. 8) and/or via RRC signaling (descriptions of example embodiments associated therewith are provided below with reference to FIG. 6A and FIG. 9).

Upon providing the information of the at least one added active duration, the method 300 may proceed to operation S330, at which the serving DU may be configured to provide an LTM cell switch command to the UE. Specifically, the serving DU may generate a MAC CE comprising the LTM cell switch command, and may provide the MAC CE to the UE during the at least one added active duration. The LTM cell switch command may enable or instruct the UE to perform an LTM cell switch from the serving cell to a target cell. According to embodiments, the LTM cell switch command may include the target cell identity and indicate the LTM configuration of the target cell. In some implementations, the MAC CE and/or the LTM cell switch command may further include LTM fallback configuration. The LTM fallback configuration may include LTM configuration of at least one secondary target cell to be used for LTM failure recovery. Further, the serving DU may generate the MAC CE by generating a new MAC CE, or by modifying an existing MAC CE (e.g., a MAC CE previously utilized for providing LTM cell switch command in the past, etc.).

According to embodiments in which the at least one UE includes a plurality of UEs, the serving DU may provide a group MAC CE to the plurality of UEs. The group MAC CE may include the same information (e.g., information of the at least one added active duration, LTM cell switch command, LTM fallback configuration, etc.), and may be provided to the plurality of UEs in any suitable sequence. For instance, the group MAC CE may be broadcasted on the PDCCH, and the plurality of UEs that are monitoring the PDCCH may simultaneously or sequentially obtain the group MAC CE therefrom. A common LTM RNTI could be used to keep the PDCCH monitoring limited to the LTM configured UE(s).

Figure 4:
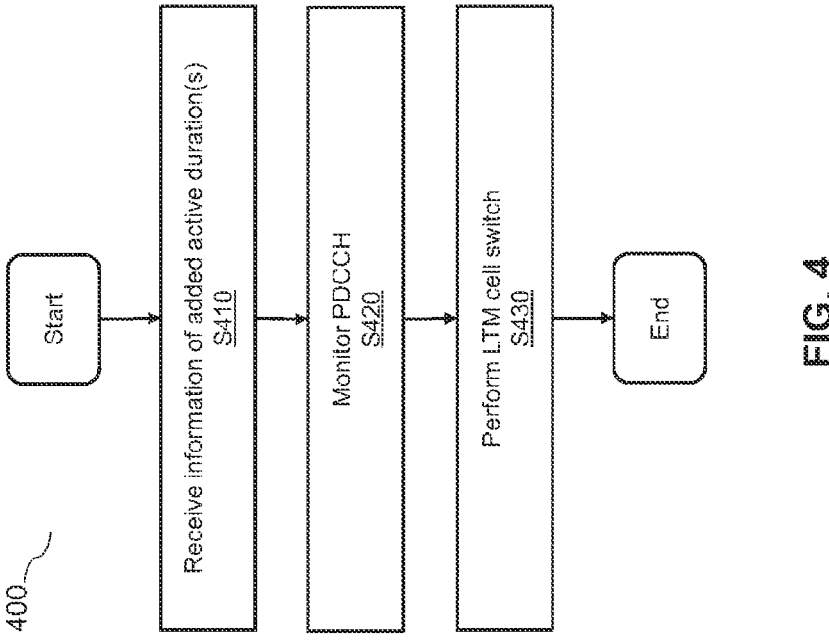
FIG. 4 illustrates a flow diagram of an example method for receiving an LTM cell switch command and performing an LTM cell switch, according to one or more embodiments.

Referring next to FIG. 4, which illustrates operations on the UE side. Specifically, FIG. 4 illustrates a flow diagram of an example method 400 for receiving an LTM cell switch command and performing an LTM cell switch, according to one or more embodiments. One or more operations of method 400 may be performed by a user equipment (UE). The UE may be configured with LTM, and may be connected to a serving cell associated with a serving DU.

Referring to FIG. 4, at operation S410, the UE may be configured to receive information of at least one active duration. Specifically, the UE may be configured to receive, from the serving DU, the information of at least one active duration added by the serving DU to at least one Cell DTX/DRX cycle associated with the serving cell. The at least one added active duration may be an LTM-specific active duration.

As described above with reference to operation S320, the information of the at least one added active duration may include information of a plurality of active durations added by the serving DU (based on an active duration factor) to a plurality of Cell DTX/DRX cycles, or may include information of at least one active duration added by the serving DU (based on information of a predicted LTM cell switch) to at least one associated Cell DTX/DRX cycle. Said information may include a start time and an end time of the added active duration(s), information of the predicted LTM cell switch (if any), information of the active duration factor (if any), and the like. Further, the UE may be configured to receive said information in a MAC CE (that is different from the MAC CE that includes an LTM cell switch command) and/or in an RRC Reconfiguration message (that is provided by a CU communicatively coupled to the serving DU).

Upon receiving the information of the at least one added active duration, the method 400 may proceed to operation S420, at which the UE may be configured to monitor, during the at least one added active duration, the Physical Downlink Control Channel (PDCCH). Specifically, the UE may monitor the PDCCH during the LTM cell switch command transmission window (defined at least by the at least one added active duration), and then decode the PDCCH to obtain a MAC CE that includes the LTM cell switch command. In this regard, if the DU has added a plurality of active durations (at operation S310), the UE may monitor the PDCCH during the plurality of added active durations. According to embodiments, the LTM cell switch command transmission window may be defined by both regular active durations and the at least one added active duration. In this case, the UE may monitor the PDCCH during both the regular active durations and the at least one added active duration.

According to embodiments, the LTM cell switch command (that is included in the MAC CE) may include the target cell identity and an indication of the LTM configuration of a target cell, to which the UE should be switched. In some implementations, the MAC CE may further include LTM fallback configuration. The LTM fallback configuration may include LTM configuration of at least one secondary target cell.

Upon obtaining the LTM cell switch command, the method 400 may proceed to operation S430, at which the UE may be configured to perform an LTM cell switch from the serving cell to the target cell. For instance, the UE may detach from the serving cell and may apply the LTM configuration of the target cell (included in the LTM cell switch command). Subsequently, the UE may perform a random access procedure (e.g., Random Access Channel (RACH) procedure, etc.) to connect to the target cell, if the UE has not yet acquired the timing advance (TA) of the target cell. On the other hand, if the UE has acquired the TA of the target cell, the UE may adjust its uplink (UL) transmission according to the TA, thereby connecting to the target cell.

According to embodiments, the method 400 may further include one or more operations upon performing the LTM cell switch at operation S430. Specifically, the UE may determine whether or not the LTM cell switch has been successfully performed, and then perform one or more operations based thereon.

For instance, based on determining that the LTM cell switch has been successfully performed, the UE may indicate the successful completion of the LTM cell switch towards the target cell (which is now acting as the new serving cell) and the associated DU. According to embodiments, the UE may send a UL data packet or a message to the target cell and/or the target DU to indicate a successful LTM cell switch. Upon receiving the indication of the successful LTM cell switch, the serving DU may deactivate or revert the added active duration(s). In some implementations, based on determining that the LTM cell switch is successful, the UE may provide, to a central unit (CU) associated with the serving DU, an RRC Reconfiguration Acknowledge message.

In addition, based on determining that the LTM cell switch is unsuccessful, the UE may be configured to perform a secondary LTM cell switch. Specifically, the UE may receive the LTM fallback configuration from the serving DU, and may autonomously or automatically perform, based on the LTM fallback configuration, the secondary LTM cell switch from the serving cell to a secondary cell, without requiring a further LTM cell switch command. Descriptions of an example embodiment are provided below with reference to FIG. 11.

Figure 5:
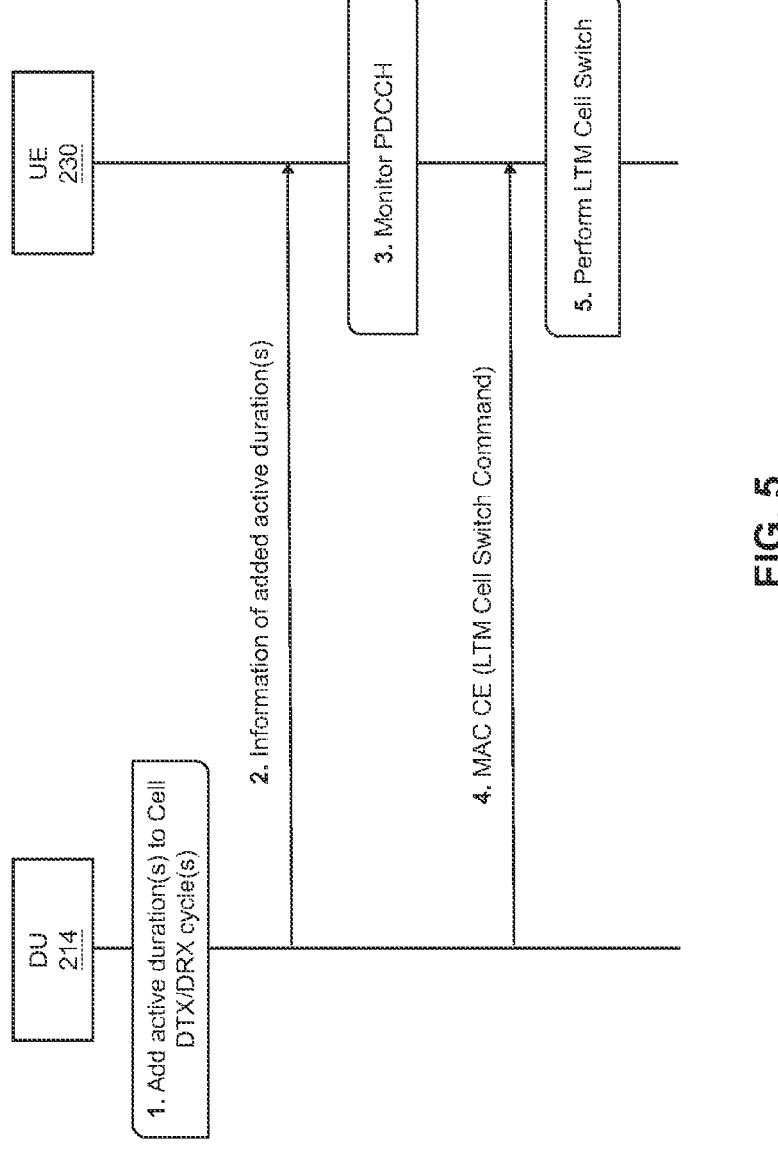
FIG. 5 illustrates a flow sequence of an example embodiment in which the operations of the methods in FIG. 3 and FIG. 4 are performed in sequence, according to one or more embodiments.

In some implementations, the operations of the method 300 and the method 400 may be performed in sequence. For instance, FIG. 5 illustrates a flow sequence of an example embodiment in which the operations of the method 300 and the method 400 are performed in sequence, according to one or more embodiments. The flow sequence may involve at least one DU and at least one UE. For descriptive purposes, the example embodiment of FIG. 5 is illustrated as involving the serving DU 214 and the UE 230 described above with reference to FIG. 2.

Referring to FIG. 5, the serving DU 214 may first add at least one active duration to at least one Cell DTX/DRX cycle associated with a serving cell (at step 1). Subsequently, the serving DU 214 may provide the information of the at least one added active duration to the UE 230 (at step 2). Upon receiving the information of the at least one added active duration, the UE 230 may monitor the PDCCH during the at least one added active duration (at step 3). Accordingly, the serving DU 214 may provide a MAC CE that includes an LTM cell switch command to the UE 230 during the at least one added active duration (at step 4). Since the UE 230 is monitoring the PDCCH during the at least one added active duration, the UE 230 can timely receive the MAC CE from the DU 214. Next, the UE 230 may perform an LTM cell switch according to the LTM cell switch command that is included in the MAC CE (at step 5). Steps 1, 2, and 4 in FIG. 5 may be similar to operations S310, S320, and S330 in method 300, respectively. Steps 3 and 5 in FIG. 5 may be similar to operations S420 and S430 in method 400.

To this end, example embodiments of the present disclosure provide features and mechanisms for the base station (e.g., DU) to add at least one active duration to at least one Cell DTX/DRX cycle of a serving cell, such that the base station can introduce an additional or a dedicated LTM cell switch command transmission window for providing the LTM cell switch command to the UE. Further, example embodiments of the present disclosure also provide features and mechanisms for the UE to receive information of at least one added active duration of at least one Cell DTX/DRX cycle, and then monitor the PDCCH during at least the LTM cell switch command transmission window defined by the at least one added active duration, thereby receiving the LTM cell switch command from the base station. Ultimately, the LTM cell switch command may be timely provided to the UE, thereby avoiding any delay in the LTM cell switch and mitigating the risk of RLF due to the delayed LTM cell switch.

Example Use Case: Adding Active Durations Based on Active Duration Factor

As described above, according to embodiments, a distributed unit (DU) of a base station (e.g., gNB) may be configured to add a plurality of active durations in a plurality of DRX cycles associated with a serving cell, based on an active duration factor. The DU may include a serving DU (e.g., a serving NG-RAN node DU) and the plurality of added active durations may include a plurality of LTM-specific active durations.

According to embodiments, the serving DU may initiate the operations for adding the plurality of active durations, when the serving DU determines that the serving cell is configured with Cell DTX/DRX (e.g., during the bring-up process of the serving cell, etc.).

As another example, the information for adding the plurality of active durations may be provided to the serving cell at the initial stage (e.g., during the bring-up process of the serving cell), while the operations for adding the plurality of active durations may be initiated under a specific condition(s). For instance, the operations for adding the plurality of active durations may be initiated or activated when the UE fails to receive the LTM cell switch command under regular Cell DTX/DRX configuration, when the serving DU fails to deliver the LTM cell switch command under regular Cell DTX/DRX configuration, and the like.

According to embodiments, the serving DU may select an active duration factor and then add a plurality of active durations to a plurality of Cell DTX/DRX cycles based thereon. Subsequently, the serving DU may provide information of the plurality of added active durations (e.g., information of the active duration factor, etc.) to a UE (or a group of UEs) via RRC signaling. Descriptions of example embodiments associated therewith are provided below with reference to FIG. 6A to FIG. 7.

Figure 6A:
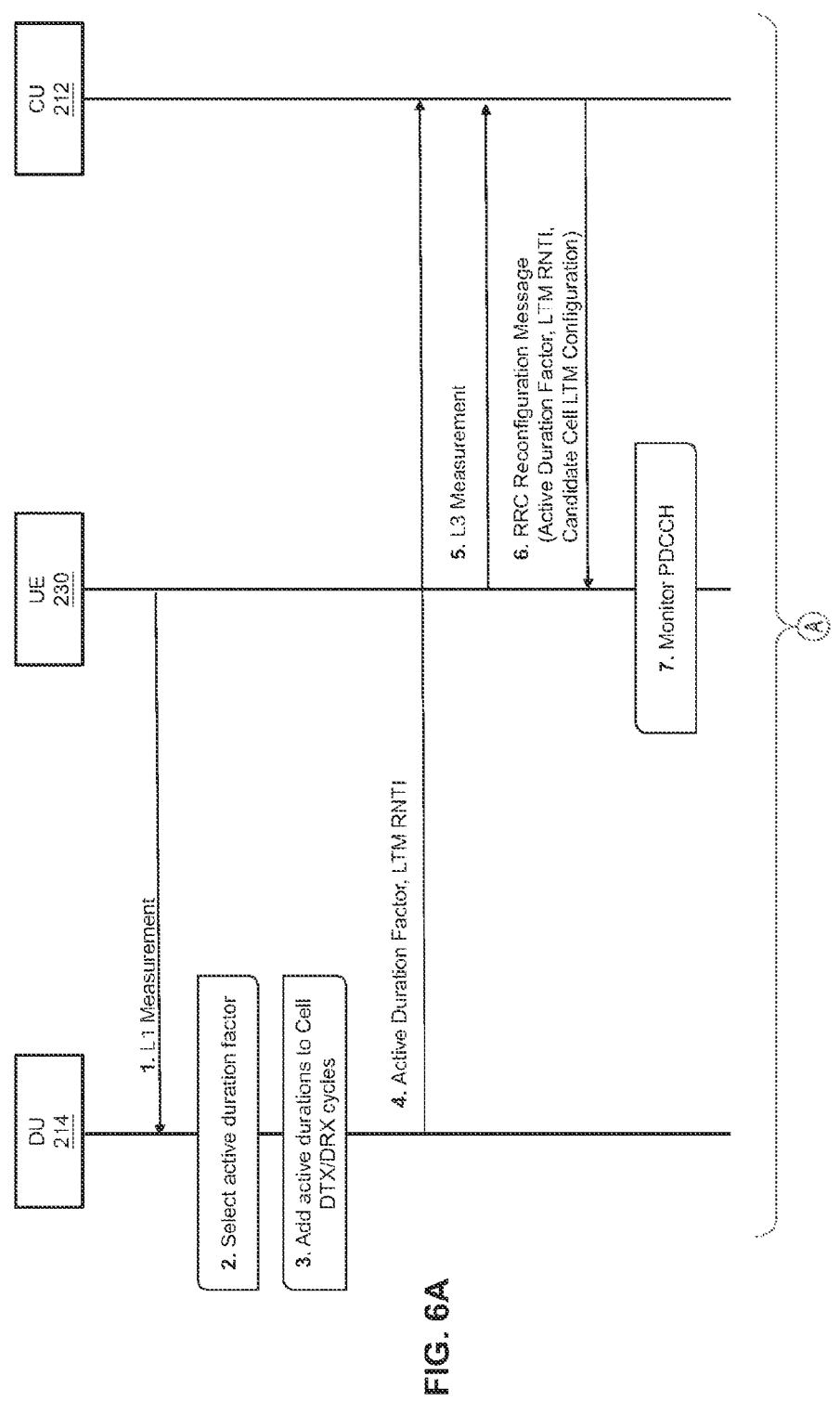
FIG. 6A and FIG. 6B illustrate a flow sequence of an example use case for facilitating Cell DTX/DRX interworking with LTM by adding a plurality of active durations based on an active duration factor, according to one or more embodiments.
Figure 6B:
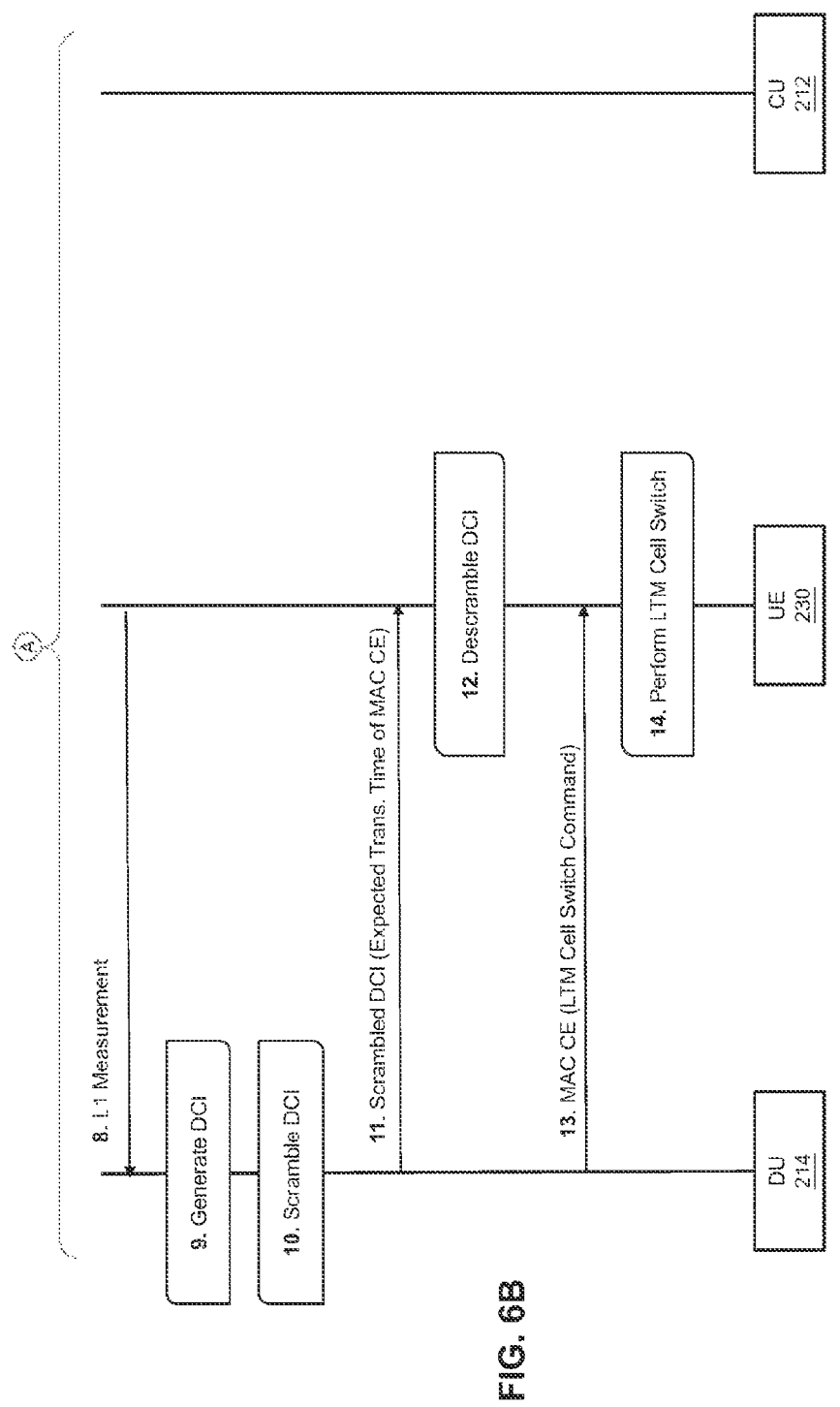

FIG. 6A and FIG. 6B illustrate a flow sequence of an example use case for facilitating Cell DTX/DRX interworking with LTM by adding a plurality of active durations based on an active duration factor, according to one or more embodiments. The CU 212, serving DU 214, and UE 230 in FIG. 6A and FIG. 6B may be similar to those described above with reference to FIG. 2 and/or FIG. 5. Further, one or more operations in FIG. 6A and FIG. 6B may involve or may be part of one or more operations described above with reference to FIG. 3 and FIG. 4. For instance, steps 1 to 3 and steps 4 to 6 in FIG. 6A may be part of operations S310 and S320 in FIG. 3, respectively, step 7 in FIG. 6A may be similar to operation S420 in FIG. 4, step 13 in FIG. 6B may be similar to operation S330 in FIG. 3, and step 14 in FIG. 6B may be similar to operation S430 in FIG. 4.

Referring to FIG. 6A, at step 1, the UE 230 may provide at least one L1 measurement to the serving DU 214. For instance, the UE 230 may provide at least one L1 measurement report comprising one or more parameters obtained via the L1 measurement, such as Reference Signal Received Power (RSRP), Reference Signal Received Quality (RSRQ), Signal-to-Noise and Interference Ratio (SINR), and the like. The L1 measurement may be associated with a serving cell and/or one or more candidate cells.

Upon receiving the L1 measurement, at step 2, the serving DU 214 may select an active duration factor based on the L1 measurement. According to embodiments, the serving DU 214 may predict, based on the L1 measurement, a timing of the LTM cell switch during a non-active duration. For instance, the serving DU 214 may predict that the LTM cell switch is expected during an upcoming non-active duration (when the serving cell is in the sleep mode). Example operations for predicting the LTM cell switch are described below with reference to FIG. 8. Accordingly, the serving DU 214 may select, from a plurality of predefined active duration factors based on the L1 measurement, an active duration factor corresponding to the predicted timing. For instance, each of the predefined active duration factors may be a respective factor of an existing active duration, and the serving DU 214 may select the active duration factor that can extend the active duration to cover the timing at which the LTM cell switch is expected.

According to embodiments, the active duration factor may have a value greater than 1. By way of example, assuming that the existing/regular active duration is 20 ms and the active duration factor has a value of "1.5". In this case, the plurality of added active durations would be 30 ms (i.e., 1.5*20 ms). Similarly, each of the predefined active duration factors may be a respective factor of an existing active duration. By way of example, a first predefined active duration factor may be a factor "1.5" of the existing active duration, a second predefined active duration factor may be a factor "2.0" of the existing active duration, and the like.

It is contemplated that, in some implementations, the active duration factor (and the plurality of predefined active duration factors) may have a value equal to or smaller than 1 (e.g., when the serving DU 214 would like to simply add active durations that have the same length of the existing/regular active duration, when the serving DU 214 determines that LTM cell switch is expected during a non-active duration and the required time for providing the LTM cell switch command is lesser than the length of the existing/regular active duration, etc.).

Referring still to FIG. 6A, upon selecting the active duration factor, at step 3, the serving DU 214 may add a plurality of active durations to a plurality of Cell DTX/DRX cycles of the serving cell. For instance, the serving DU 214 may determine, based on the active duration factor, which of the Cell DTX/DRX cycles should be modified and how the active duration should be added to the Cell DTX/DRX cycles. By way of example, the serving DU 214 may determine or compute, based on the active duration factor, a start time and an end time of the additional active durations, and then add the active durations to the associated Cell DTX/DRX cycles. According to embodiments, the serving DU 214 may add the active durations to all available Cell DTX/DRX cycles. Alternatively, the serving DU 214 may add the active durations to a portion of Cell DTX/DRX cycles. In this way, the serving DU 214 can introduce additional or dedicated LTM cell switch command transmission windows to the Cell DTX/DRX cycles, thereby ensuring that the LTM cell switch command can be timely provided to the UE 230 when required.

Subsequently, at step 4, the serving DU 214 may provide information of the added active durations to the CU 212 via the F1 interface. For instance, in the example embodiment of FIG. 6A, the information of the added active durations may include information of the active duration factor and information of an LTM Radio Network Temporary Identifier (RNTI). The LTM RNTI may be generated by the serving DU 214, when the serving DU 214 determines that the UE 230 is configured with LTM (when the UE 230 is first connected to the serving cell, etc.). According to embodiments in which the UE 230 includes a group of UEs, the serving DU 214 may generate an LTM group RNTI, which is applicable to the group of UEs. According to embodiments, the LTM RNTI may be specific to the UE 230 and/or may be specific to at least one UE configured with LTM (e.g., another UE that is connected to the same serving cell served or hosted by the serving DU 214). It is contemplated that, although it is described hereinabove that the serving DU 214 provides the active duration factor along with the LTM RNTI to the CU 212, in some implementations, the serving DU 214 may provide the LTM RNTI in a message that is separated from the message for providing the active duration factor, without departing from the scope of the present disclosure.

At step 5, the UE 230 may provide at least one L3 measurement to the CU 212. According to embodiments, the at least one L3 measurement may include at least one RRC measurement. Upon receiving the L3 measurement, at step 6, the CU 212 may provide, to the UE 230, at least one RRC Reconfiguration message that includes the information of the added active durations (e.g., the active duration factor), the information of the LTM RNTI, and the LTM configuration of a candidate cell(s).

Specifically, the CU 212 may determine one or more candidate cells based on the L3 measurements provided by the UE 230, and may prepare the LTM configuration of the candidate cell(s) thereafter. Accordingly, the CU 212 may generate at least one RRC Reconfiguration message that includes information of the LTM configuration of the candidate cell(s), as well as the LTM RNTI and the information of the active duration (e.g., the active duration factor) that may be received from the serving DU 214 at step 4. Subsequently, the CU 212 may provide the at least one RRC Reconfiguration message to the UE 230. In this regard, it can be understood that the LTM configuration of the candidate cell(s) may also include the LTM configuration of a target cell, since the target cell can be selected from among the candidate cell(s). Further, in some implementations, step 5 may be optional, and the CU 212 may provide the RRC Reconfiguration message that includes the LTM RNTI and the extension factor to the UE 230 without involving the L3 measurement.

Upon receiving the RRC Reconfiguration message, at step 7, the UE 230 may monitor the PDCCH, according to the information of the added active durations. Specifically, the UE 230 may determine, based on the active duration factor (that is included in the RRC Reconfiguration message), which Cell DTX/DRX cycles have been added an active duration, what is the start time and end time of the added active durations, and the like, and may monitor the PDCCH during the added active durations. According to embodiments, the UE 230 may determine, based on the information of the added active durations, information of LTM cell switch command transmission windows, and may monitor the PDCCH during the LTM cell switch command transmission windows. In some implementations, the LTM cell switch command transmission windows may be defined by both the regular/existing active durations and the added active durations. In this case, the UE 230 may monitor the PDCCH during both the regular/existing active durations and the added active durations.

It is contemplated that the UE 230 may be provided with the any required information (e.g., information of the Cell DTX/DRX configuration or pattern of the serving cell, etc.) for determining the LTM cell switch command transmission windows based on the active duration factor, in any suitable manner (e.g., the UE 230 may be provided with said required information when the UE 230 is first connected to the serving cell, etc.), without departing from the scope of the present disclosure.

In view of the above, the UE 230 can monitor the PDCCH in addition to or in alternative to the regular/existing active durations, thereby ensuring that the LTM cell switch command can be timely received when required.

According to embodiments in which the UE 230 is configured with C-DRX, the UE 230 may adjust the associated DRX cycles according to the information of the active durations added to the Cell DTX/DRX cycles of the serving cell. For instance, the UE 230 may determine whether or not the on-durations in the associated DRX cycles are at least partially aligned with the regular active durations and the added active durations of the Cell DTX/DRX cycles. Accordingly, based on determining that the on-durations in the associated DRX cycles is not aligned with the regular and/or added active durations of the Cell DTX/DRX cycles, the UE 230 may adjust (e.g., add/extend the on-durations, offset the on-durations, etc.) the associated DRX cycles such that the on-durations therein are at least partially aligned with the regular and/or added active durations of the Cell DTX/DRX cycles. In this way, the UE 230 can ensure that the monitoring of the PDCCH can be performed when the UE 230 is configured with C-DRX, thereby ensuring that the LTM cell switch command can be timely received when required.

When monitoring the PDCCH, the UE 230 may continuously (or periodically) perform at least one L1 measurement on the serving cell and/or the candidate cell(s). Referring next to FIG. 6B, at step 8, the UE 230 may provide (e.g., periodically, continuously, etc.) at least one L1 measurement (e.g., in one or more L1 measurement reports) to the serving DU 214.

Upon receiving the L1 measurement from the UE 230, the serving DU 214 may determine whether or not an LTM cell switch is required. For instance, the serving DU 214 may determine, based on one or more parameters included in the L1 measurement, whether or not one or more LTM cell switch criteria are met or satisfied. According to embodiments, the serving DU 214 may compare one or more parameters (e.g., RSRP, etc.) in the L1 measurement to one or more predefined threshold values, thereby determining whether or not the LTM cell switch is expected or is required.

Accordingly, based on determining that the LTM cell switch is expected or is required, at step 9, the serving DU 214 may generate a Downlink Control Information (DCI) that includes information of an LTM cell switch command. For instance, the DCI may include information of an expected transmission time of a MAC CE or information of a timing at which the cell switch command is required or is expected to be transmitted to the UE 230 (that includes the LTM cell switch command).

Upon generating the DCI, at step 10, the serving DU 214 may scramble the DCI. According to embodiments, the serving DU 214 may scramble the DCI based on the LTM RNTI (e.g., generated by the serving DU 214 at step 4, etc.). In some implementations, the serving DU 214 may scramble the DCI based on the LTM RNTI, in a similar manner as the procedure of scrambling the DCI format 2_6 based on PS-RNTI, as described in one or more 3GPP technical specifications. According to embodiments in which the UE 230 includes a group UEs, the serving DU 214 may scramble the DCI based on the LTM group RNTI.

Accordingly, at step 11, the serving DU 214 may provide the scrambled DCI to the UE 230. For instance, the serving DU 214 may map the scrambled DCI onto the PDCCH, such that the UE 230 may obtain the scrambled DCI by monitoring and decoding the PDCCH. Subsequently, at step 12, the UE 230 may decode the PDCCH to obtain the scrambled DCI, and then descramble the scrambled DCI based on the LTM RNTI (received by the UE 230 at step 6). In this way, the UE 230 may obtain the information of the LTM cell switch command (e.g., the expected transmission time of the MAC CE that includes the LTM cell switch), and may monitor the specific active duration(s) to ensure that the LTM cell switch command can be timely received.

At step 13, the serving DU 214 may generate the MAC CE that includes the LTM cell switch command, and may provide the MAC CE to the UE 230. The LTM cell switch command may include information of the target cell (e.g., cell ID, LTM configuration, etc., of the target cell). According to embodiments, the MAC CE may further include LTM fallback configuration. The LTM fallback configuration may include information of one or more secondary target cells (e.g., cell ID, LTM configuration, etc., of the one or more secondary target cells) that met one or more cell switch criteria. According to embodiments in which the UE 230 includes a group of UEs, the serving DU 214 may generate a group MAC CE and may provide the group MAC CE to the group of UEs.

Upon receiving the MAC CE from the serving DU 214, at step 14 the UE 230 may perform an LTM cell switch from the serving cell to the target cell, based on the LTM cell switch command (included in the MAC CE). This step may be similar to operation S430 in FIG. 4 and step 5 in FIG. 5. Thus, redundant descriptions associated therewith may be omitted below for conciseness.

According to embodiments, upon performing the LTM cell switch at step 14, the UE 230 may determine whether or not the LTM cell switch has been successfully performed, and may perform one or more operations based thereon.

For instance, based on determining that the LTM cell switch has been successfully performed, the UE 230 may send a UL data packet or a message to the new serving cell (i.e., previously target cell) and/or the associated DU, thereby indicating the successful LTM cell switch. Accordingly, the serving DU 214 may revert or deactivate the added active durations in the Cell DTX/DRX cycles of the previous serving cell. In some implementations, based on determining that the LTM cell switch is successful, the UE 230 may provide, to a central unit (CU), an RRC Reconfiguration Acknowledge message.

As another example, based on determining that the LTM cell switch is unsuccessful, the UE 230 may automatically or autonomously perform, based on LTM fallback configuration, a secondary LTM cell switch from the serving cell to a secondary target cell. Descriptions of an example embodiment associated therewith are provided below with reference to FIG. 11.

Figure 7:
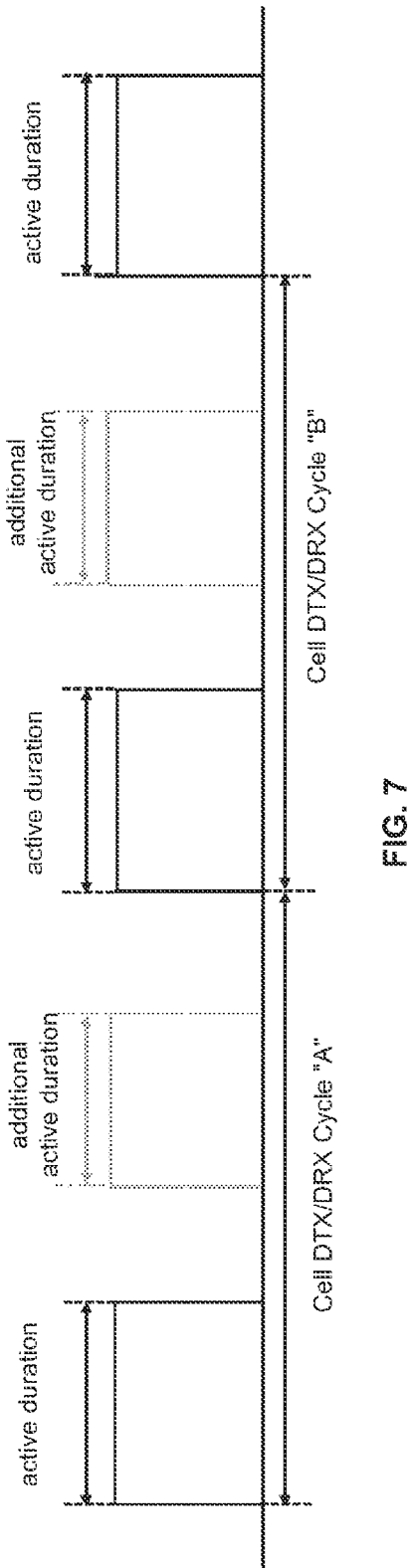
FIG. 7 illustrates a diagram of example Cell DTX/DRX cycles of an example use case associated with the flow sequence of FIG. 6A and FIG. 6B, according to one or more embodiments.

Referring next to FIG. 7, which illustrates a diagram of example Cell DTX/DRX cycles of an example use case associated with the flow sequence of FIG. 6A and FIG. 6B, according to one or more embodiments. Specifically, FIG. 7 illustrates a diagram of example Cell DTX/DRX cycles associated with a serving cell, in which a plurality of active durations have been added therein based on at least one active duration factor, according to one or more embodiments.

Referring to FIG. 7, a plurality of active durations have been added to a plurality of Cell DTX/DRX cycles. Specifically, each of the Cell DTX/DRX cycles "A" and "B" have been added one active duration. Namely, by adding an active duration to the associated Cell DTX/DRX cycle, the LTM cell switch transmission windows can be effectively added or extended.

According to embodiments, the configuration of the active duration may be predefined or adjustable by the network operator. For instance, the length of the active duration may be defined or adjustable by the network operator by controlling the active duration factor, the timing for adding the active durations may be defined or adjustable by the network operator by controlling the timing for providing the active duration factor, and the like.

According to embodiments, during the LTM cell switch command transmission windows (defined by regular active durations and/or the additional active durations), the UE may monitor the PDCCH to obtain the LTM cell switch command and then perform an LTM cell switch thereafter. In some embodiments, the additional active durations may be dedicated or specific to LTM-related operations. For instance, during the additional active durations, the UE may only monitor the PDCCH to obtain the LTM cell switch command and/or may only perform the LTM cell switch, the serving DU may only transmit the MAC CE that includes the LTM cell switch command, and the like, without performing other non-LTM related operations.

In view of the above, example embodiments of the present disclosure provide features and mechanisms for effectively facilitating Cell DTX/DRX interworking with LTM, thereby ensuring proper execution of LTM for a serving cell configured with Cell DTX/DRX.

Specifically, example embodiments of the present disclosure enable the base station (e.g., DU) to add a plurality of active durations in a plurality of Cell DTX/DRX cycles associated with a serving cell, thereby introducing additional or dedicated LTM cell switch command transmission windows for providing the LTM cell switch command to the UE and ensuring that the LTM cell switch command can be timely provided to the UE. Further, example embodiments of the present disclosure enable the UE to receive information of the added active durations, thereby enabling the UE to monitor the PDCCH during the LTM cell switch command transmission windows defined at least by the added active durations and receiving the LTM cell switch command therefrom. Ultimately, the above-described embodiments provide approaches (in alternative to or in addition to those described below with reference to FIG. 8 to FIG. 10) to ensure that the LTM cell switch command can be timely provided to the UE, thereby avoiding any delay in the LTM cell switch and mitigating the risk of RLF due to the delayed LTM cell switch.

Example Use Case: Predicting LTM Cell Switch and Adding Specific Active Duration As described above, according to embodiments, a distributed unit (DU) of a base station (e.g., gNB) may be configured to predict an LTM cell switch and add at least one active duration in at least one Cell DTX/DRX cycle associated with a serving cell. The DU may include a serving DU (e.g., a serving NG-RAN node DU), and the at least one added active duration may include an LTM-specific active duration.

According to embodiments, the serving DU may predict a timing at which the LTM cell switch is expected or is required, and may add at least one active duration associated therewith to accommodate the timing at which the LTM cell switch is expected and/or a timing at which the cell switch command is required or expected to be transmitted or delivered to the associated UE(s).

Upon adding the active duration(s), the serving DU may provide the information of the added active duration(s) to the UE. According to embodiments, the serving DU may provide said information to the UE using a downlink (DL) MAC CE. Additionally or alternatively, the serving DU may provide said information to the UE using RRC signaling. Descriptions of an example embodiment in which the serving DU provides the information to the UE via MAC CE are provided below with reference to FIG. 8, and descriptions of an example embodiment in which the serving DU provides the information to the UE via RRC signaling are provided below with reference to FIG. 9. According to embodiments, providing the information via MAC CE may be simpler and faster with minimum overhead, as compared to providing the information via RRC signaling.

Figure 8:
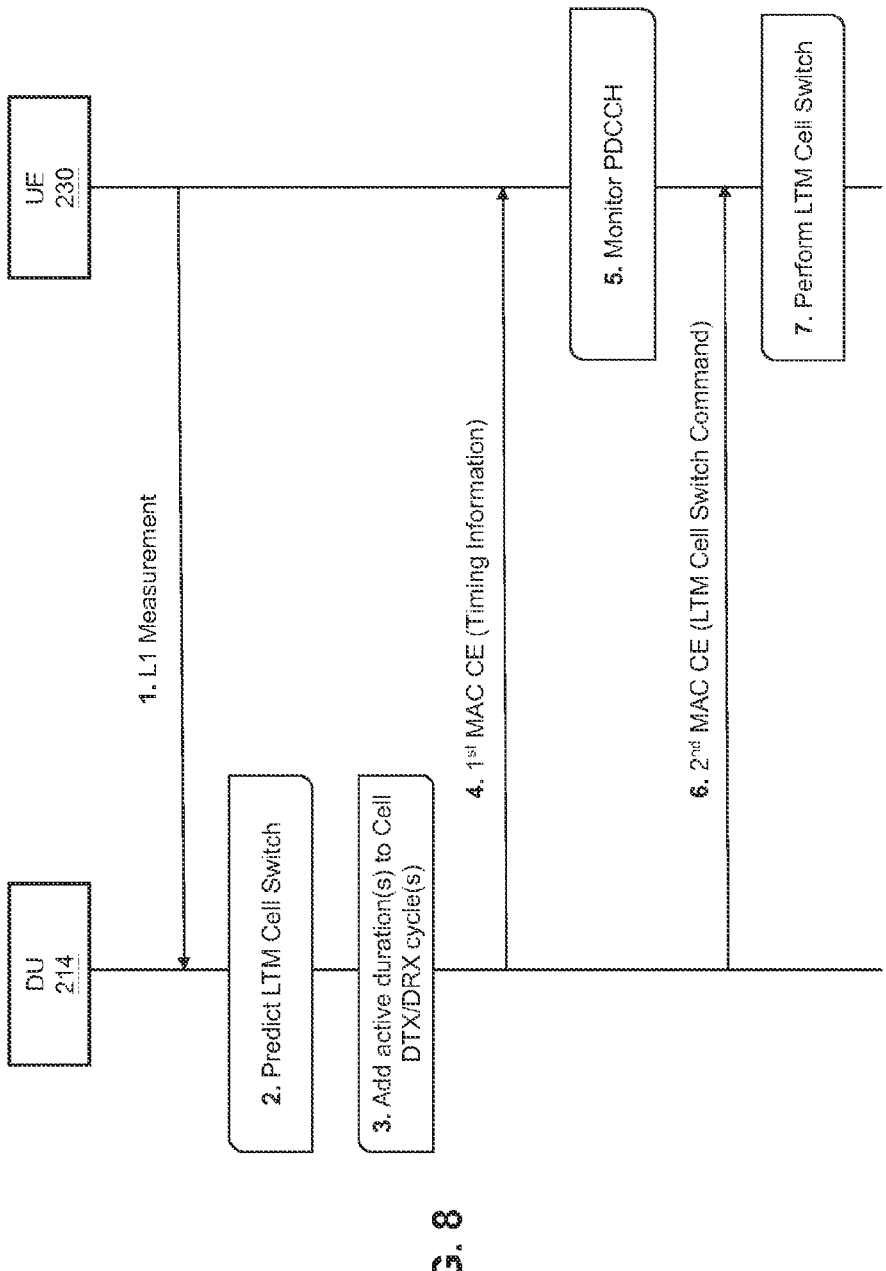
FIG. 8 illustrates a flow sequence of an example use case for facilitating Cell DTX/DRX interworking with LTM by adding at least one active duration based on a predicted LTM cell switch and for providing information of the at least one added active duration via a MAC CE, according to one or more embodiments.

FIG. 8 illustrates a flow sequence of an example use case for facilitating Cell DTX/DRX interworking with LTM by adding at least one active duration based on a predicted LTM cell switch and for providing information of the at least one added active duration via a MAC CE, according to one or more embodiments. The flow sequence may involve at least one DU and at least one UE. For descriptive purposes, the example embodiment of FIG. 8 is illustrated as involving the serving DU 214 and the UE 230 described above with reference to FIG. 2. Further, one or more operations in FIG. 8 may involve or may be part of one or more operations described above with reference to FIG. 3 to FIG. 6B. For instance, step 1 in FIG. 8 may be part of operation S310 in FIG. 3 or may be similar to step 1 in FIG. 6A, steps 5 to 7 in FIG. 8 may be similar to steps 3 to 5 in FIG. 5, and the like.

Referring to FIG. 8, at step 1, the UE 230 may provide at least one L1 measurement to the serving DU 214. This step may be similar to step 1 in FIG. 6A. Thus, redundant descriptions associated therewith may be omitted below for conciseness.

At step 2, the serving DU 214 may predict an LTM cell switch. Specifically, upon receiving the L1 measurement from the UE 230, the serving DU 214 may determine whether or not the LTM cell switch is required or is expected immediately (e.g., in the current Cell DTX/DRX cycle, etc.). Based on determining that the LTM cell switch is not required or not expected immediately, the DU 214 may determine whether or not the LTM cell switch is expected or is required after a period of time (e.g., whether or not the LTM cell switch is expected in the next Cell DTX/DRX cycle, is expected after two Cell DTX/DRX cycles, etc.).

According to embodiments, the serving DU 214 may compare a value of RSRP associated with the serving cell with a predefined threshold value, thereby determining whether or not the LTM cell switch is required or is expected. By way of example, based on determining that the RSRP value is below the predefined threshold value, the serving DU 214 may determine that the LTM cell switch is required or is expected immediately. Further, based on determining that the RSRP value is equal to the predefined threshold value, the serving DU 214 may determine that the LTM cell switch is required or is expected at a first predefined timing in an upcoming non-active duration. On the other hand, based on determining that the RSRP value is greater than the predefined threshold value, the serving DU 214 may determine that the LTM cell switch is required or is expected at a second predefined timing in the upcoming non-active duration.

According to embodiments, the serving DU 214 may compare the value of RSRP associated with the serving cell with a plurality of predefined threshold values, thereby determining whether or not the LTM cell switch is required or is expected. By way of example, based on determining that the RSRP value satisfies a condition associated with a first predefined threshold value (e.g., lower/greater/equal to the first predefined threshold value, etc.), the serving DU 214 may determine that the LTM cell switch is required or is expected immediately. Similarly, based on determining that the RSRP value satisfies a condition associated with a second predefined threshold value (e.g., lower/greater/equal to the second predefined threshold value, etc.), the serving DU 214 may determine that the LTM cell switch is required or is expected at a first predefined timing in an upcoming non-active duration, and based on determining that the RSRP value satisfies a condition associated with a third predefined threshold value (e.g., lower/greater/equal to the third predefined threshold value, etc.), the serving DU 214 may determine that the LTM cell switch is required or is expected at a second predefined timing in the upcoming non-active duration.

It is contemplated that the serving DU 214 may predict the LTM cell switch based on any other suitable parameter(s) in the L1 measurement, such as the SINR, the RSRQ, and the like, in a similar manner. Further, the serving DU 214 may predict the LTM cell switch for a plurality of upcoming durations, may compare the value of RSRP associated with the serving cell with a value of RSRP associated with a candidate cell, may compare the value of RSRP associated with the candidate cell with a predefined threshold value(s), and the like, without departing the scope of the present disclosure.

According to embodiments, the serving DU 214 may predict the LTM cell switch based on at least one Artificial Intelligence (AI)/Machine Learning (ML) model. The AIML model may be trained via any suitable training methods, such as supervised learning (in which the AI/ML model is trained based on input data and corresponding predefined parameters), unsupervised learning (in which the AI/ML model is trained without predefined parameters), semi-supervised learning (in which the AI/ML model is trained with a mix of predefined data/parameters and non-predefined data/parameters), reinforcement learning (in which the AI/ML model is trained based on input data and a feedback signal resulting from the model's output in an environment the model is interacting with), and the like.

According to embodiments, the serving DU 214 (or any other suitable component) may train the AI/ML model with, for example, trajectories of the UE 230 (e.g., paths taken by the end user associated with the UE 230, etc.), L1 RSRP value(s) when an LTM cell switch occurred in the past, cell IDs of the serving cell(s) and target cell(s) involved in previous LTM cell switch(es), and the like.

To this end, the serving DU 214 may utilize the trained AI/ML model to predict the LTM cell switch. For instance, the serving DU 214 may input one or more parameters of the L1 measurement (e.g., RSRP, RSRQ, SINR, etc.) into the AI/ML model, and the AI/ML model may automatically provide an output indicating whether or not the LTM cell switch is expected and a timing at which the LTM cell switch is expected (if any).

Upon predicting the LTM cell switch, at step 3, the serving DU 214 may add at least one active duration to at least one Cell DTX/DRX cycle of the serving cell. Specifically, the serving DU 214 may determine which Cell DTX/DRX cycle(s) is associated with the predicted LTM cell switch, and then add the active duration to the associated Cell DTX/DRX cycle(s) to accommodate the timing at which the LTM cell switch is expected and/or a timing at which the cell switch command is required or expected to be delivered or transmitted to the UE 230. Accordingly, the serving DU 214 may introduce or add at least one LTM cell switch command transmission window that accommodates the timing at which the LTM cell switch is expected and/or the timing at which the cell switch command is required or expected to be transmitted or delivered to the UE 230.

In some implementations, the serving DU 214 may add the at least one active duration to accommodate the timing at which the LTM cell switch is expected and/or a timing at which the MAC CE (that includes the LTM cell switch command) is required or expected to be transmitted or delivered to the UE 230 (may also be referred to as an "arrival time of the MAC CE" or an "expected transmission time of the MAC CE" herein).

For instance, the serving DU 214 may predict that an LTM cell switch is expected in the next "x ms", and the LTM cell switch command is required/expected to be delivered/transmitted to the UE by "y ms" before "x ms". Accordingly, the serving DU 214 may add one or more active durations in the associated Cell DTX/DRX cycle(s) to accommodate the timing at which the LTM cell switch is expected and/or the expected transmission time of the MAC CE. According to embodiments, one or more of the timings (e.g., "x ms", "y ms", etc.) may be predefined and/or configurable by the network operator (via the base station). Alternatively, one or more of said timings may be determined by the serving DU 214 based on the predicted LTM cell switch. For instance, the serving DU 214 may configure or adjust the length of the additional active duration(s) based on determining that the predicted LTM cell switch may require longer/lesser time than a regular/existing active duration, and the like.

Upon adding the at least one active duration, at step 4, the serving DU 214 may provide the information of the at least one added active duration to the UE 230. Specifically, in the example embodiment of FIG. 8, the serving DU 214 may generate a first MAC CE that includes information of the added active duration(s), and information of an expected transmission time of a second MAC CE (which includes the LTM cell switch command). Subsequently, the serving DU 214 may provide the first MAC CE to the UE 230. The first MAC CE may be different from the second MAC CE. Further, the first MAC CE may be provided to the UE 230 during an active duration prior to the added active duration(s), and the second MAC CE may be provided to the UE 230 during the added active duration(s). According to embodiments in which the UE 230 includes a group UEs, the first MAC CE may be a first group MAC CE and the second MAC CE may be a second group MAC CE.

Upon receiving the first MAC CE, at step 5, the UE 230 may monitor the PDCCH during the added active duration(s). Specifically, the UE 230 may determine one or more LTM cell switch command transmission windows that are defined by the added active duration(s), and then monitor the PDCCH during the LTM cell switch command transmission windows.

Subsequently, at step 6, the serving DU 214 may generate the second MAC CE that includes the LTM cell switch command. According to embodiments, the second MAC CE may further include LTM fallback configuration. Next, the serving DU 214 may provide the second MAC CE to the UE 230 during the added active duration(s). Specifically, the serving DU 214 may provide the second MAC CE to the UE 230 via PDCCH. Since the UE 230 is monitoring the PDCCH during added active duration(s), the UE 230 may decode the PDCCH during the added active duration(s), thereby timely obtaining the second MAC CE therefrom.

Upon obtaining the second MAC CE, the UE 230 may obtain the LTM cell switch command therefrom and may perform an LTM cell switch from a serving cell to a target cell. Example operations associated therewith are described above with reference to operation S430 in method 400 and may be similar to step 14 in FIG. 6B. Thus, redundant descriptions associated therewith may be omitted below for conciseness.

According to embodiments, upon performing the LTM cell switch, the UE 230 may determine whether or not the LTM cell switch has been successfully performed, and may further perform one or more operations based thereon. Example operations associated therewith are described above with reference to FIG. 6B.

In view of the above, the serving DU 214 may add at least one active duration based on a predicted LTM cell switch and may provide the information associated with the added active duration(s) to the UE 230 via a MAC CE. Alternatively or additionally, the DU 214 may provide said information to the UE 230 via RRC signaling.

Figure 9:
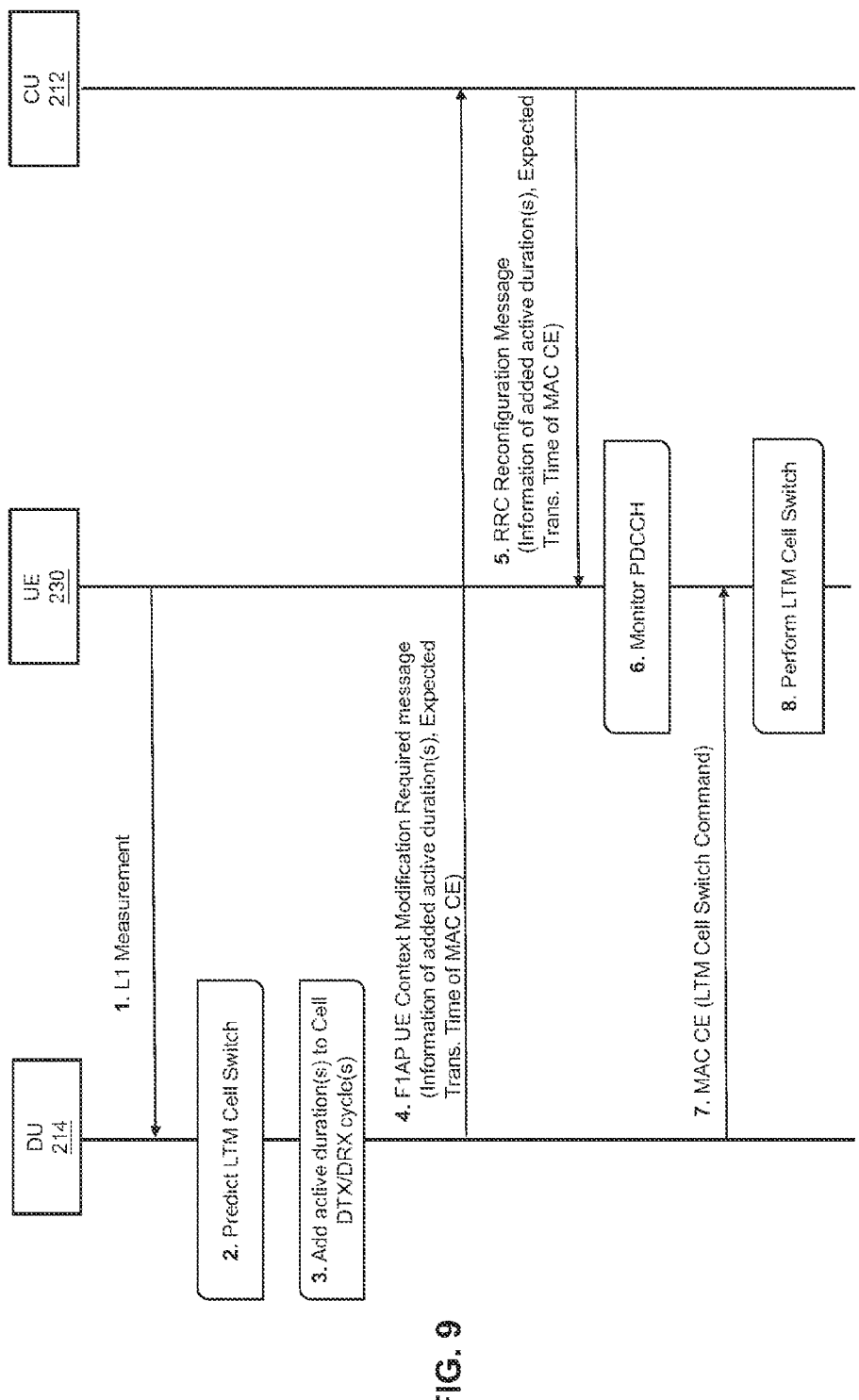
FIG. 9 illustrates a flow sequence of an example use case for facilitating Cell DTX/DRX interworking with LTM by adding at least one active duration based on a predicted LTM cell switch and for providing information of the at least one added active duration via RRC signaling, according to one or more embodiments.

FIG. 9 illustrates a flow sequence of an example use case for facilitating Cell DTX/DRX interworking with LTM by adding at least one active duration based on a predicted LTM cell switch and for providing information of the at least one added active duration via RRC signaling, according to one or more embodiments. The flow sequence may involve at least one DU, at least one CU, and at least one UE. For descriptive purposes, the example embodiment of FIG. 8 is illustrated as involving the serving DU 214, the CU 212, and the UE 230 described above with reference to FIG. 2. Further, one or more operations in FIG. 9 may involve or may be part of one or more operations described above with reference to FIG. 3 to FIG. 8. For instance, steps 1, 2, and 3 in FIG. 9 may be similar to steps 1, 2, and 3 in FIG. 8, respectively, steps 6, 7, and 8 in FIG. 9 may be similar to steps 3, 4, and 5 in FIG. 5, respectively, and may be similar to steps 5, 6, and 7 in FIG. 8, respectively, and the like.

Referring to FIG. 9, at step 1, the UE 230 may provide at least one L1 measurement to the serving DU 214. Accordingly, at step 2, the serving DU 214 may predict an LTM cell switch. Next, at step 3, the serving DU 214 may add at least one active duration to at least one Cell DTX/DRX cycle associated with a serving cell. As described above, steps 1, 2 and 3 in FIG. 9 may be similar to steps 1, 2, and 3 in FIG. 8, respectively. Thus, redundant descriptions associated therewith may be omitted below for conciseness.

Subsequently, at step 4, the serving DU 214 may provide the information of the added active duration(s) and information of the predicted LTM cell switch to the CU 212 via F1 interface. For instance, the serving DU 214 may initiate a UE Context Modification procedure towards the CU 212, by sending an F1 Application Protocol (F1AP) UE Context Modification Required message to the CU 212. The F1AP UE Context Modification Required message may include information of the at least one added active duration (e.g., start time, end time, etc.) and information of an expected transmission time of the MAC CE (that includes the LTM cell switch command).

Upon receiving the information of the predicted LTM cell switch, at step 5, the CU 212 may generate and provide an RRC Reconfiguration message to the UE 230. The RRC Reconfiguration message may include the information of the added active duration, and information of an expected transmission time of the MAC CE (that includes the LTM cell switch command).

Upon receiving the RRC Reconfiguration message, at step 6, the UE 230 may monitor the PDCCH. Further, at step 7, the serving DU 214 may provide the MAC CE (that includes the LTM cell switch command) to the UE 230. Next, at step 8, the UE 230 may perform an LTM cell switch from the serving cell to the target cell, according to the LTM cell switch command. As described above, steps 6, 7, and 8 in FIG. 9 may be similar to steps 3, 4, and 5 in FIG. 5, respectively, and may be similar to steps 5, 6, and 7 in FIG. 8, respectively. Thus, redundant descriptions associated therewith may be omitted below for conciseness.

Figure 10:
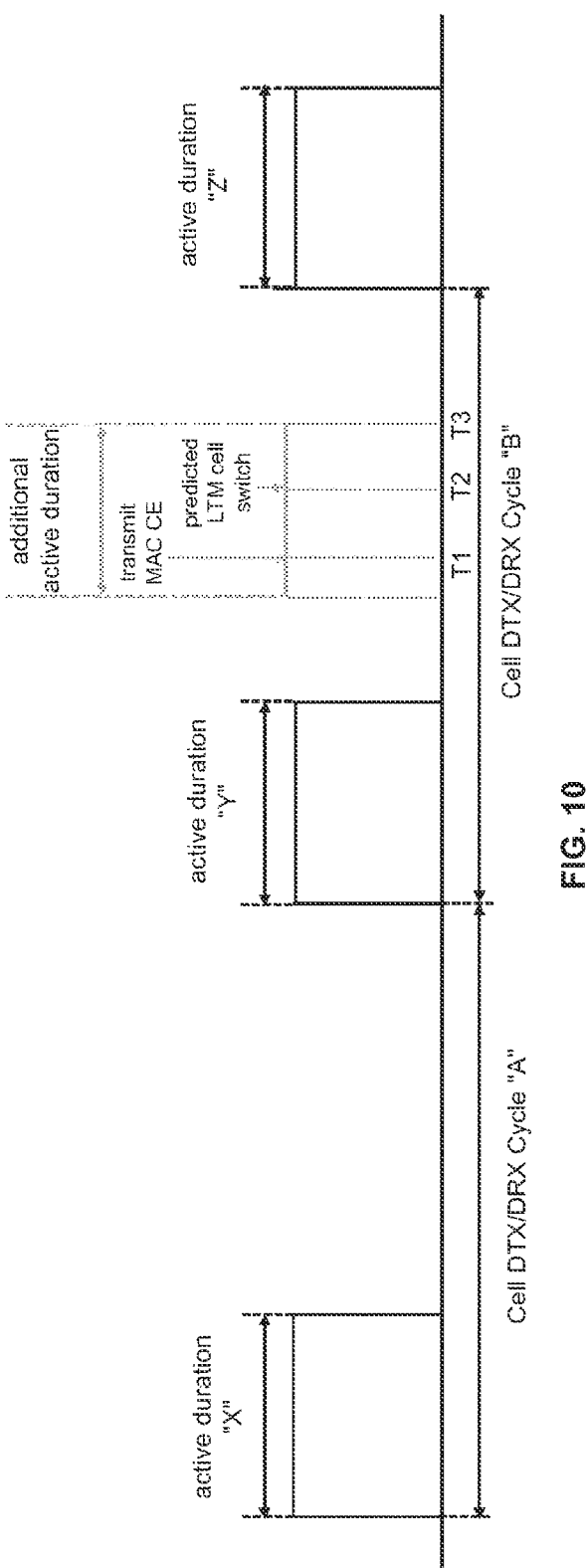
FIG. 10 illustrates a diagram of example Cell DTX/DRX cycles of an example use case associated with the flow sequences of FIG. 8 and FIG. 9, according to one or more embodiments.

Referring next to FIG. 10, which illustrates an example use case associated with the flow sequences of FIG. 8 and FIG. 9, according to one or more embodiments. Specifically, FIG. 10 illustrates a diagram of example Cell DTX/DRX cycles associated with a serving cell, in which an active duration has been added based on information of a predicted LTM cell switch, according to one or more embodiments.

Specifically, in the example use case in FIG. 10, the serving DU may predict that an LTM cell switch is expected in the Cell DTX/DRX Cycle "B". For instance, the serving DU may predict that the LTM cell switch is expected in an non-active duration of the Cell DTX/DRX cycle "B" (within duration T2-T3), an LTM cell switch command is expected/required to be transmitted/delivered to the UE by T1 such that the UE can timely obtain and execute the LTM cell switch, and the UE is required to monitor the PDCCH at least before duration T1 in order to timely decode the PDCCH to obtain the MAC CE and then obtain the LTM cell switch command from the MAC CE. In this regard, the serving DU may add an additional active duration in the Cell DTX/DRX cycle "B" to accommodate timings T1-T3, which are the timing for transmitting the MAC CE (i.e., the expected transmission time of the MAC CE) and the timing at which the LTM cell switch is predicted.

Upon adding the active duration, the serving DU may provide the information of the added active duration to the UE in one or more of the active durations before the added active duration. For instance, the serving DU may provide said information to the UE during one or more of active durations "X" and "Y". Further, the serving DU may provide said information via one or more of DL MAC CE and RRC signaling, as described above with reference to FIG. 8 and FIG. 9, respectively. It is contemplated that the serving DU may also provide said information to the UE in other active duration(s) before the active duration "X", without departing from the scope of the present disclosure.

Upon receiving the information of the added active duration, the UE may determine, based on the received information, the information for PDCCH monitoring. For instance, the UE may determine, based on the information of the added active duration, at least one LTM cell switch command transmission window, of which timing the PDCCH should be monitored, and the like. To this end, the UE may monitor the PDCCH during the LTM cell switch transmission window, which are defined at least by the additional active duration.

It is contemplated that, in some implementations, the LTM cell switch transmission window may be defined by both the regular/existing active duration(s) and the additional active duration. In that case, the UE may determine the information for monitoring the PDCCH, based on the information of the added active duration and the regular configuration/pattern of the Cell DTX/DRX (which may be provided to the UE when the UE first connected to the serving cell).

According to embodiments in which the UE is configured with C-DRX, the UE may modify, based on the information of the added active duration, the associated DRX cycle (e.g., extending the associated on-duration, offsetting the DRX cycle such that the existing on-duration is at least partially aligned with the added active duration, etc.), to ensure that the UE is in wake-up mode and can monitor the PDCCH during the added active duration.

Accordingly, during the added active duration, the DU may generate and transmit a MAC CE (that includes the LTM cell switch command) to the UE via PDCCH. Since the UE is monitoring the PDCCH during the added active duration, the UE may timely receive the MAC CE therefrom. Next, the UE may obtain the LTM cell switch command from the MAC CE and then perform the LTM cell switch based thereon. According to embodiments in which the UE includes a group of UEs, the serving DU may provide a group MAC CE (that may include the same information as the MAC CE, such as the information of the at least one added active duration, etc.) to the UE, in a similar manner.

In view of the above, example embodiments of the present disclosure provide features and mechanisms for the base station (e.g., DU) to predict an LTM cell switch and to add at least one active duration to at least one Cell DTX/DRX cycle, based on the information of a predicted LTM cell switch. Accordingly, the base station may provide the information of the added active duration(s) to the UE in various ways (e.g., via MAC CE, via RRC signaling, etc.), such that the UE may be configured to monitor the PDCCH during the added active duration(s). Ultimately, the LTM cell switch command may be timely provided to the UE, thereby avoiding any delay in the LTM cell switch and mitigating the risk of RLF due to the delayed LTM cell switch.

Example Use Case: Performing Secondary LTM
Cell Switch Based on LTM Fallback Configuration As described above, according to embodiments, the distributed unit (DU) may provide LTM fallback configuration to the UE, such that the UE may perform at least one secondary LTM cell switch based thereon when a primary LTM cell switch is unsuccessful. The DU may include a serving DU (e.g., a serving NG-RAN node DU).

Specifically, upon receiving at least one L1 measurement from the UE, the serving DU may select one candidate cell that meets one or more cell switch criteria as the primary target cell, and then select at least one of the remaining candidate cells that also meets the one or more cell switch criteria as the secondary target cell. Accordingly, the serving DU may provide, to the UE, LTM fallback configuration that includes the configuration of the secondary target cell, such that the UE may autonomously perform a secondary LTM cell switch from the serving cell to the secondary target cell when the LTM cell switch to the primary target cell is unsuccessful, without requiring any additional cell switch command from the serving DU.

The LTM cell switch to a primary target cell may be referred to as a "primary LTM cell switch" herein, and the LTM cell switch(s) to at least one secondary target cell may be referred to as a "secondary LTM cell switch" herein. In some implementations, the at least one secondary target cell may include a plurality of secondary target cells, and the secondary LTM cell switch may include more than one secondary LTM cell switch. Thus, the primary LTM cell switch may also be referred to as a "first LTM cell switch", and the at least one secondary LTM cell switch may include a "second LTM cell switch", a "third LTM cell switch", and the like.

According to embodiments, the LTM fallback configuration may include LTM configuration of the secondary target cell(s), and the serving DU may provide the LTM fallback configuration to the UE in various ways. For instance, the serving DU may include the LTM fallback configuration into the LTM cell switch command, or may include the LTM fallback configuration into the MAC CE that includes the LTM cell switch command. In this regard, in addition to the LTM configuration of the primary target cell and the LTM configurations of the secondary target cell(s), the MAC CE may further include one or more conditions for initiating or triggering the at least one secondary LTM cell switch (e.g., one or more thresholds values, parameters, or the like, that may indicate to the UE when to perform the secondary LTM cell switch upon determining that the primary LTM cell switch is unsuccessful, etc.). Subsequently, the serving DU may provide the MAC CE to the UE, such that the LTM fallback configuration can be provided to the UE before the execution of the primary LTM cell switch. The example operations for generating and providing the MAC CE that includes the LTM cell switch command are described above with reference to FIG. 3 to FIG. 10.

In view of the above, when generating the MAC CE to include the LTM cell switch command (that instructs the UE to perform the primary LTM cell switch), the serving DU may include the LTM fallback configuration into the MAC CE, such that the DU may provide the LTM fallback configuration to the UE when providing the LTM cell switch command.

Figure 11:
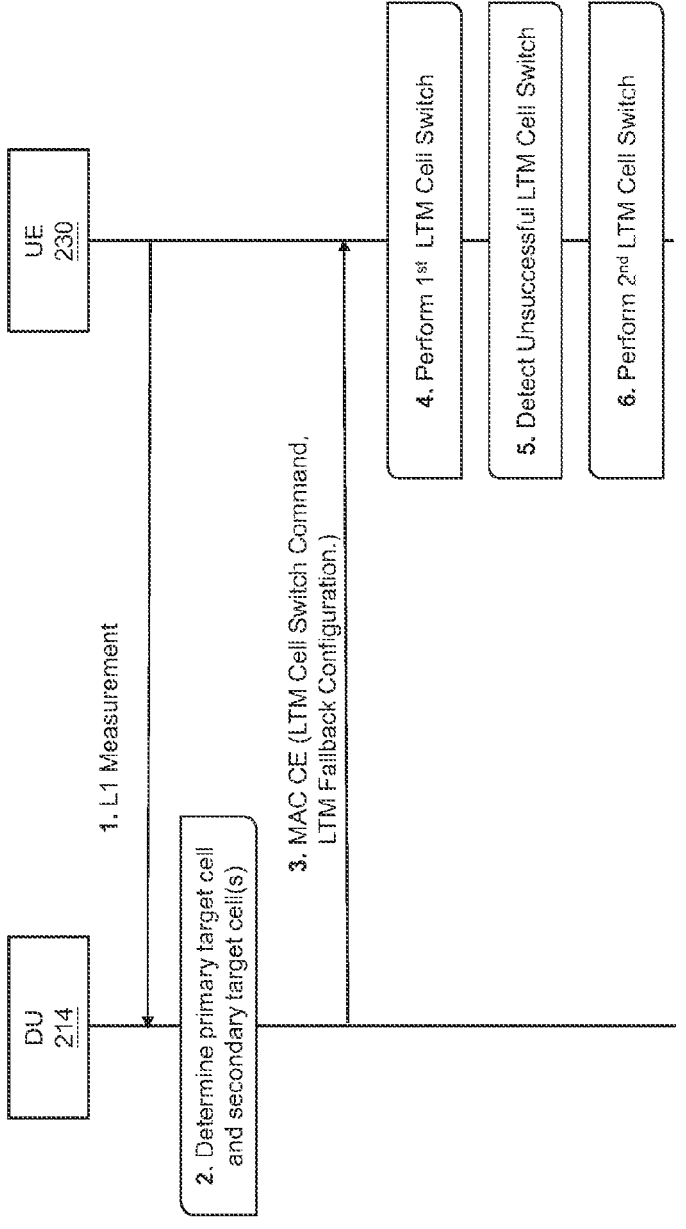
FIG. 11 illustrates a flow sequence of an example use case in which an LTM fallback configuration is provided to the UE, according to one or more embodiments.

FIG. 11 illustrates a flow sequence of an example use case for providing the LTM fallback configuration to the UE and enabling the UE to perform at least one secondary LTM cell switch, according to one or more embodiments. The flow sequence may involve at least one DU and at least one UE. For descriptive purposes, the example embodiment of FIG. 11 is illustrated as involving the serving DU 214 and the UE 230 described above with reference to FIG. 2. Further, one or more operations in FIG. 11 may involve or may be part of one or more operations described above with reference to FIG. 3 to FIG. 10. For instance, step 1 in FIG. 11 may be similar to step 1 in FIG. 6A, FIG. 8, and FIG. 9, step 4 in FIG. 11 may be similar to step 5 in FIG. 5, step 14 in FIG. 6B, step 7 in FIG. 8, and step 8 in FIG. 9, respectively, and the like.

Referring to FIG. 11, at step 1, the UE 230 may provide at least one L1 measurement to the serving DU 214. As described above, step 1 in FIG. 11 may be similar to step 1 in FIG. 6A, FIG. 8, and FIG. 9. Thus, redundant descriptions associated therewith may be omitted below for conciseness.

Upon receiving the at least one L1 measurement, at step 2, the serving DU 214 may determine, based on the received L1 measurement(s), a primary target cell and at least one secondary target cell. Specifically, upon receiving the L1 measurement(s) from the UE 230, the serving DU 214 may determine, from among a plurality of candidate cells, whether or not any of the candidate cells meet one or more cell switch criteria. The information of the candidate cells may be provided to the serving DU 214 by a CU (e.g., CU 212) that is hosting or serving the serving DU 214.

In this regard, if the serving DU 214 determines that there is only one candidate cell that meets the cell switch criteria, the serving DU 214 may select said candidate cell as the primary target cell. On the other hand, if the serving DU 214 determines that there are multiple candidate cells that meet the cell switch criteria, the serving DU 214 may select one of said multiple candidate cells as the primary target cell, and then select at least one of the remaining candidate cells (that meet the cell switch criteria) as the secondary target cell.

According to embodiments, the serving DU 214 may determine the primary target cell and the secondary target cell(s) based on one or more conditions predefined or configurable by the network operator. Descriptions of several example use cases are provided in the following.

For example, based on determining that there are multiple candidate cells that meet the cell switch criteria, the serving DU 214 may select the candidate cell that meets the highest number of cell switch criteria as the primary target cell, select the candidate cell that meets the second highest number of cell switch criteria as the secondary target cell, and the like. By way of example, assuming that a first candidate cell meets two cell switch criteria, a second candidate cell meets one cell switch criteria, and a third candidate cell does not meet any cell switch criteria, the serving DU 214 may select the first candidate cell as the primary target cell and then select the second candidate cell as the secondary target cell, without considering the third candidate cell (since it does not meet the minimum requirement as a target cell).

As another example, based on determining that there are multiple candidate cells that meet the cell switch criteria, the serving DU 214 may select the candidate cell that meets the highest priority cell switch criteria as the primary target cell, and then select the candidate cell that meets the second highest priority cell switch criteria as the secondary target cell. For instance, assuming that a first candidate cell meets a cell switch criteria that has the highest priority (e.g., criteria associated with RSRP, etc.) and a second candidate cell meets a cell switch criteria that has the second highest priority (e.g., criteria associated with SINR, etc.), the serving DU 214 may select the first candidate cell as the primary target cell, and then select the second candidate cell as the secondary target cell.

It is contemplated that the examples described above are merely for descriptive purposes, and do not limit the scope of the present disclosure. Specifically, the serving DU 214 may select the primary target cell and the secondary target cell(s) in any other suitable manners and/or based on any other suitable parameters/conditions, without departing from the scope of the present disclosure.

Upon selecting the primary target cell and the at least one secondary target cell, at step 3, the serving DU 214 may provide the LTM cell switch command (that includes information of the primary target cell) and the LTM fallback configuration to the UE 230. Specifically, the serving DU 214 may generate an LTM cell switch command that includes LTM configuration of the primary target cell, and then generate a MAC CE that includes the LTM cell switch command and the LTM fallback configuration. Subsequently, the serving DU 214 may provide the MAC CE to the UE 230 (e.g., via PDCCH).

Upon receiving the MAC CE from the serving DU 214, at step 4, the UE 230 may perform a first LTM cell switch (e.g., a primary LTM cell switch) from the serving cell to the primary target cell, based on the LTM cell switch command included in the MAC CE. Step 4 in FIG. 11 may be similar to operation S430 in FIG. 4, step 5 in FIG. 5, step 14 in FIG. 6B, step 7 in FIG. 8, and step 8 in FIG. 9. Thus, redundant descriptions associated therewith may be omitted below for conciseness.

Subsequently, at step 5, the UE 230 may detect or determine whether or not the first LTM cell switch is successful. For instance, the UE 230 may determine that the first LTM cell switch (i.e., the primary LTM cell switch) is unsuccessful, based on determining whether or not an RLF has occurred, whether or not a communication with the primary target cell is successful after performing the first LTM cell switch, and the like.

Based on detecting that the first LTM cell switch is unsuccessful, the UE 230 may autonomously or automatically trigger the secondary LTM cell switch, without requiring any additional cell switch command from the serving DU 214. Specifically, at step 6, the UE 230 may perform a second LTM cell switch (e.g., a secondary LTM cell switch) from the serving cell to the secondary target cell, based on the LTM fallback configuration (which is received by the UE 230 at step 3).

It is contemplated that the example use case described hereinabove are merely for descriptive purposes, and should not limit the scope of the present disclosure. Specifically, the serving DU 214 may select the secondary target cell(s) and/or provide the LTM fallback configuration to the UE

230 in any other suitable manner, without departing from the scope of the present disclosure.

For instance, instead of determining the secondary target cell(s) at step 2, the DU 214 may determine the secondary target cell(s) at step 5, when the UE 230 determines that the first LTM cell switch is unsuccessful. As another example, the serving DU 214 may provide the LTM fallback configuration in a MAC CE different from the MAC CE that includes the LTM cell switch command. By way of example, the DU may first provide a first MAC CE that includes the LTM cell switch command to the UE, and then provide a second MAC CE that includes the LTM fallback configuration to the UE at a later time.

Furthermore, one or more operations in FIG. 11 may be repeated until the UE 230 is successfully switched from the serving cell to a target cell. For example, if the second LTM cell switch performed at step 6 is unsuccessful, the UE 230 may perform a third LTM cell switch from the serving cell to a third target cell, in a similar manner as described above. Furthermore, it can be understood that one or more operations in FIG. 11 may be included in any of the example embodiments described above with reference to FIG. 2 to FIG. 10 and described below with reference to FIG. 12 to FIG. 14.

To this end, example embodiments of the present disclosure provide features and mechanisms that enable the base station (e.g., DU) to provide fallback configuration to at least one UE and enable the at least one UE to receive the fallback configuration from the base station. Accordingly, the UE can autonomously perform a secondary LTM cell switch when the first, primary LTM cell switch is unsuccessful. Ultimately, the risk of RLF due to LTM cell switch failure can be reduced.

Examples of Network Node

As described above, according to embodiments, the central unit (CU) and distributed unit (DU) may be defined in a software form and deployed in one or more network nodes (e.g., server nodes, etc.). In the following, descriptions of example network nodes are provided with reference to FIG. 12 and FIG. 13.

Figure 12:
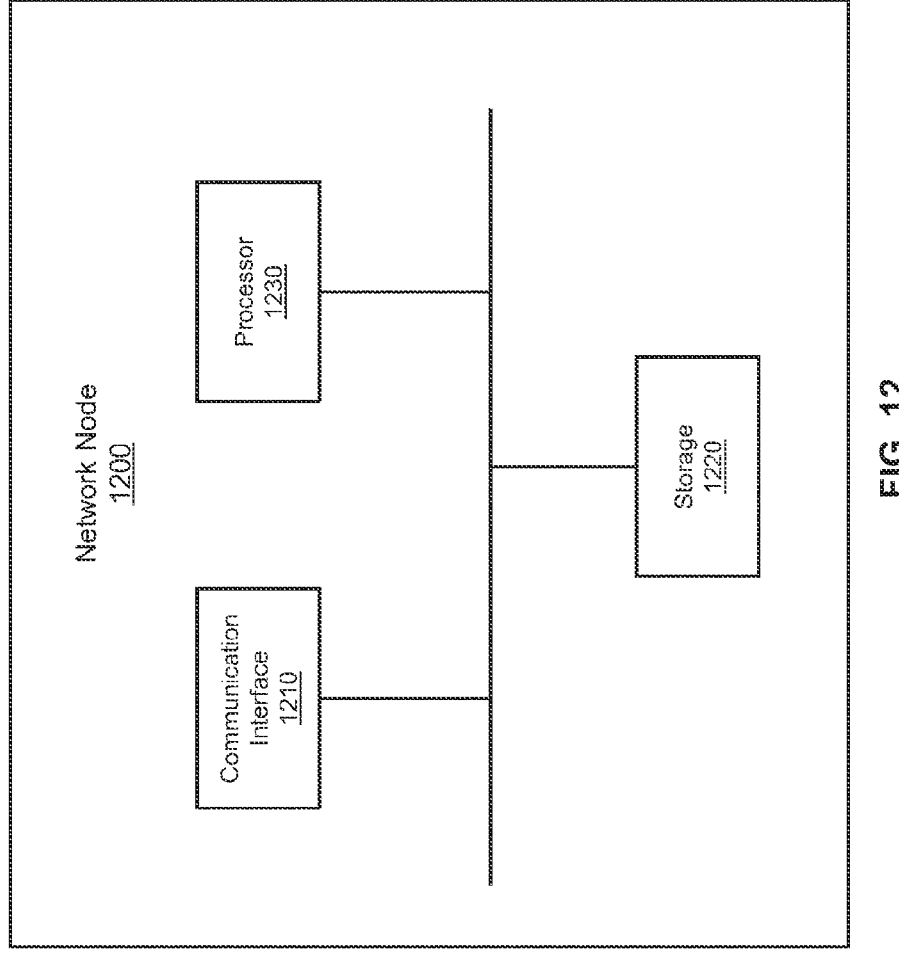
FIG. 12 illustrates a block diagram of example components of a network node, according to one or more embodiments.

FIG. 12 illustrates a block diagram of example components of a network node 1200, according to one or more embodiments. Network node 1200 may include one or more servers in which the CU and/or the DU of example embodiments may be implemented or deployed. According to embodiments, the network node 1200 may include an edge server or an edge node. Additionally or alternatively, the network node 1200 may include a central server or a central node.

As illustrated in FIG. 12, the network node 1200 may include at least one communication interface 1210, at least one storage 1220, and at least one processor 1230, although it can be understood that the network node 1200 may include more or less components than as illustrated in FIG. 12, and/or may be arranged in a manner different from as illustrated in FIG. 12, without departing from the scope of the present disclosure.

The communication interface 1210 may include at least one transceiver-like component (e.g., a transceiver, a separate receiver and transmitter, a bus, etc.) that enables the components of the server node 1200 to communicate with each other and/or to communicate with one or more components external to the network node 1200, such as via a wired connection, a wireless connection, or a combination of wired and wireless connections.

According to embodiments, the communication interface 1210 may include at least one transmitter, at least one receiver, and at least one antenna. The at least one transmitter may be configured to transmit data/information to one or more external nodes/devices using the antenna, and the at least one receiver may be configured to receive data/information from the one or more external nodes/devices using the antenna. The at least one transmitter and the at least one receiver may be collectively implemented as a single transceiver module.

For instance, the communication interface 1210 may couple the processor 1230 to the storage 1220, thereby enabling them to communicate and interoperate with each other in performing one or more operations. As another example, communication interface 1210 may couple the network node 1200 (or one or more components included therein) to one or more network elements (e.g., a network cell, a UE, etc.), so as to enable them to communicate and interoperate with each other.

According to one or more embodiments, the communication interface 1210 may include one or more application programming interfaces (APIs) that allow the network node 1200 (or one or more components included therein) to communicate with one or more software applications (e.g., software application deployed in UE, virtualized network function(s), etc.).

According to embodiments, the communication interface 1210 may include at least one input/output (I/O) interface, at least one network interface, and at least one storage interface.

According to embodiments, the I/O interface may employ communication protocols/methods such as, without limitation, audio, analog, digital, stereo, IEEE-1393, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), and the like. Via the I/O interface, the network node 1200 may communicate with at least one input device (e.g., a keyboard, a mouse, a touch screen, sensors, microphones, scanners, a camera, a fingerprint scanner, etc.) and at least one output device (e.g., a speaker, an electronic screen, etc.).

According to embodiments, the network interface may employ connection protocols including, without limitation, direct connection, Ethernet (e.g., twisted pair 10/100/1000 Base T), Transmission Control Protocol/Internet Protocol (TCP/IP), token ring, IEEE 802.11a/b/g/n/x, etc. The network node 1210 may be disposed to or in communication with a network via the network interface. Descriptions of example networks are provided below with reference to network 1430 of FIG. 14.

According to embodiments, the storage interface may employ connection protocols including, without limitation, Serial Advanced Technology Attachment (SATA), Integrated Drive Electronics (IDE), IEEE-1393, Universal Serial Bus (USB), fiber channel, Small Computer Systems Interface (SCSI), and the like. The storage interface may connect one or more components of the server node 1200 (e.g., processor 1220) to the storage 1220.

Referring still to FIG. 12, the storage 1220 may include one or more storage mediums suitable for storing data, information, and/or computer-executable instructions therein. According to embodiments, the storage 1220 may include at least one memory storage, such as a random access memory (RAM), a read-only memory (ROM), and/or another type of dynamic or static storage device (e.g., a flash memory, a magnetic memory, and/or an optical memory) that stores information and/or instructions for use by the processor 1230. Further, the storage 1220 may further include a drum, magnetic disc drive, magneto-optical drive, optical drive, Redundant Array of Independent Discs (RAID), solid-state memory devices, solid-state drives, and the like. Further descriptions of the memory are provided with reference "computer-readable medium" described herein.

Additionally or alternatively, the storage 1220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 1220 may act as a database, which may be implemented as a fault-tolerant database, a relational database, a scalable database, and a secure database. In this case, the storage 1220 may include, for example, Oracle or Sybase.

According to embodiments, the storage 1220 may be configured to store information, such as raw data, metadata, or the like, obtained from one or more nodes. Additionally or alternatively, the storage 1220 may be configured to store one or more information associated with one or more operations performed by the processor 1230. For instance, the storage 1220 may store one or more results produced or generated by the at least one processor 1230, may store information of network entities (e.g., network cells, UE, etc.) involved in the operation(s) performed by the processor 1230, information of historical operations performed by the processor 1230, and/or the like.

According to embodiments, the storage 1220 may store the software-based CU and/or the software-based DU, as well as one or more information associated therewith (e.g., computer-readable instructions for implementing the software-based CU/software-based DU, etc.). For instance, the network node 1200 may include a cloud server and the CU and/or DU may be defined in the form of a cloud-native application that runs on top of at least one OS in the cloud server.

Furthermore, the storage 1220 may include a memory or a storage medium storing a collection of program or database components, such as a user interface, an operating system, a web browser, and/or the like.

The user interface may facilitate display, execution, interaction, manipulation, or operation of program components through textual or graphical facilities. For example, one or more user interfaces may provide computer interaction interface elements on a display system operatively connected to the network nodes 1200, such as cursors, icons, checkboxes, menus, scrollers, windows, widgets, and the like. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like. In some implementations, the storage 1220 may include a plurality of storage mediums, and the storage 1220 may be configured to store a duplicate or a copy of at least a portion of the information in the plurality of storage mediums, for providing redundancy and for backing-up the information or the associated data.

The operating system may facilitate resource management and operation of the network node 1200. Examples of operating systems may include, without limitation, APPLE® MACINTOSH® OS X®, UNIX®, UNIX-like system distributions (e.g., BERKELEY SOFTWARE DISTRIBUTION® (BSD), FREEBSD®, NETBSD®, OPENBSD, etc.), LINUX® DISTRIBUTIONS (e.g., RED HAT®, UBUNTU®, KUBUNTU®, etc.), IBM®OS/2®, MICROSOFT® WINDOWS® (XP®, VISTA®/7/8, 10, 11, etc.), APPLE® IOS®, GOOGLE™ ANDROID™, BLACK-BERRY® OS, or the like.

The web browser may be a hypertext viewing application, such as MICROSOFT® INTERNET EXPLORER®, MICROSOFT® EDGE®, GOOGLE™, CHROME™, MOZILLA® FIREFOX®, APPLE® SAFARI®, and the like. Secure web browsing may be provided using Secure Hypertext Transport Protocol (HTTPS), Secure Sockets Layer (SSL), Transport Layer Security (TLS), and the like. Further, the web browser may utilize facilities such as AJAX, DHTML, ADOBE® FLASH®, JAVASCRIPT®, JAVA®, Application Programming Interfaces (APIs), and the like.

Referring still to FIG. 12, the processor 1230 may include at least one processor capable of being programmed or configured to perform a function(s) or an operation(s) described herein. According to embodiments, the processor 1230 may be configured to receive (e.g., via the communication interface 1210, etc.) one or more signals and/or instructions for triggering the performing of one or more operations.

Further, the processor 1230 may be implemented in hardware, firmware, or a combination of hardware and software. For instance, the processor 1230 may include at least one generic or specialized processing unit, such as at least one of: a central processing unit (CPU), a graphics processing unit (GPU), an accelerated processing unit (APU), a microprocessor, a microcomputer, a state machine, a logic circuit, a microcontroller, a digital signal processor (DSP), a field-programmable gate array (FPGA), an application-specific integrated circuit (ASIC), an integrated system (bus) controller, a memory management control unit, a floating point unit, a digital signal processing unit, and/or another type of processing or computing unit.

According to embodiments, the processor 1230 may be configured to execute the software-based CU and/or the software-based DU (or computer-executable instructions for implementing the CU and/or the DU) stored in at least one storage medium or memory storage (e.g., storage 1220, etc.) to thereby perform one or more actions or one or more operations described herein.

In some embodiments, the network node 1200 may implement a mail server-stored program component. The mail server may be an Internet mail server such as MICROSOFT® EXCHANGE®, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, and the like. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the server node 1200 may implement a mail client stored program component. The mail client may be a mail-viewing application, such as APPLE® MAIL, MICROSOFT® ENTOURAGE®, MICROSOFT® OUTLOOK®, MOZILLA® THUNDER-BIRD®, and the like.

Although the example embodiment in FIG. 12 is described with reference to network node for hosting or deploying a CU and/or a DU, it can be understood that the network node 1200 may also refer to a UE. Specifically, the UE may also include at least one communication interface, at least one storage, and at least one processor. In this regard, it is contemplated that one or more operations associated with the UE as described herein may be performed by, for example, the at least one processor upon executing instructions stored in the at least one storage and/or received via the communication interface, and the like, without departing from the scope of the present disclosure.

According to embodiments, the CU and/or the DU (or one or more operations associated therewith) may be implemented in the form of a containerized network function, according to one or more embodiments. Below, descriptions of an example configuration for implementing the containerized functions are provided.

Figure 13:
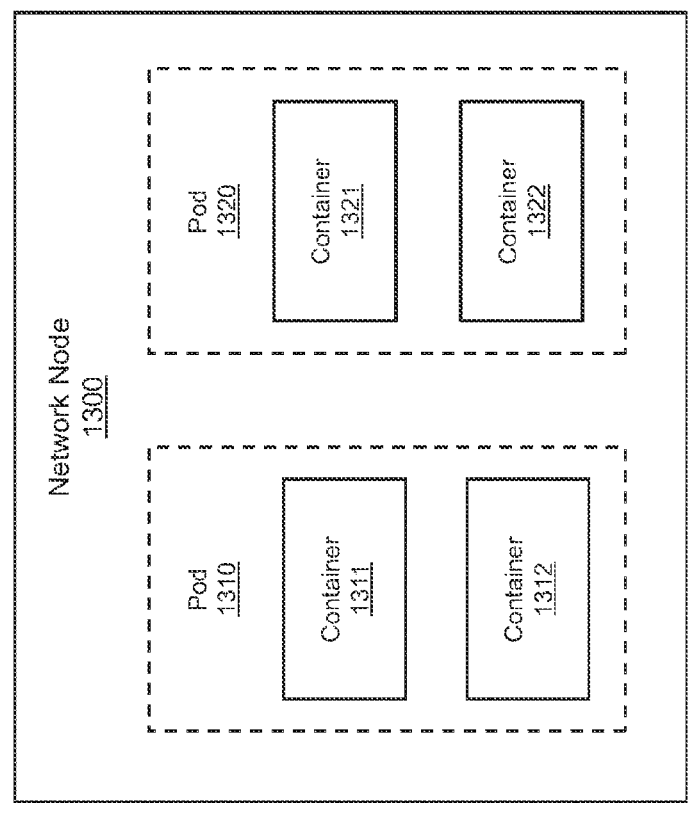
FIG. 13 illustrates a block diagram of an example configuration of a network node, according to one or more embodiments.

FIG. 13 illustrates a block diagram of an example configuration of a network node 1300, according to one or more embodiments. The network node 1300 may correspond to the network node 1200 in FIG. 12, and may be configured to implement one or more server platforms (descriptions of example embodiment associated therewith are provided below with reference to FIG. 14).

According to embodiments, the CU and/or the DU (or one or more operations associated therewith) may be defined in software form via, for example, containerization (or any other suitable technology). Accordingly, the containerized CU and/or the containerized DU may be deployed, in the form of containers, in the network node 1300, and the functionalities/operations associated with the CU/DU may be performed via execution or orchestration of the containers associated therewith.

As illustrated in FIG. 13, the network node 1300 may include a plurality of containers 1311-1312 and 1321-1322. The containerized CU and/or the containerized DU may be disaggregated or scattered among the plurality of containers 1311-1312 and 1321-1322. For instance, the functionalities or operations of the DU may be scattered among the containers 1311-1312, while the functionalities or operations of the CU may be scattered among the containers 1321-1322.

Additionally or alternatively, the containerized CU and/or the containerized DU may be segregated according to the type of operations. For instance, the functionalities or operations associated with a UE may be scattered among the containers 1311-1312, while the functionalities or operations associated with the CU and DU may be scattered among the containers 1321-1322. As another example, the functionalities or operations associated with Cell DTX/DRX may be scattered among the containers 1311-1312, while the functionalities or operations associated with LTM may be scattered among the containers 1321-1322.

According to embodiments, the network node 1300 may include a Kubernetes (K8s) node, and the containers (of the user plane) may be grouped or aggregated in a respective pod. In the example embodiment of FIG. 13, the containers 1311-1312 are included in a first pod 1310, while the containers 1321-1322 are included in a second pod 1320.

The plurality of pods in the network node 1300 may share the same resources (e.g., CPU, memory, etc.) provided by the network node 1300. The resources being allocated for facilitating and controlling the Cell DTX/DRX interworking with LTM may be managed by adjusting the associated pods and/or containers. For instance, the resources may be scaled up by increasing the number of containers and/or pods associated therewith, may be scaled down by decreasing the number of containers and/or pods associated therewith, or the like.

It can be understood that the configuration illustrated in FIG. 13 is simplified for descriptive purposes, and is not intended to limit the scope of the present disclosure. Specifically, in practice, the network node 1300 may include any suitable components for hosting and executing a plurality of pods, while the number of pods may be greater than two and the number of containers included in each pod may be greater than two, without departing from the scope of the present disclosure. Further, it can be understood that the containerized CU and/or the containerized DU (or the operations associated therewith) may be hosted or deployed in a plurality of network nodes, in a similar manner as described above. Furthermore, it can be understood that multiple nodes may include the same containers (or pods) in order to provide network redundancy thereby improving the network availability.

To this end, example embodiments of the present disclosure may provide one or more network nodes in which the CU and/or DU of example embodiments may be implemented and deployed or be implemented. Accordingly, the one or more network nodes (or one or more processors associated therewith) may be configured to execute the CU and/or the DU (or computer-executable instructions associated therewith) to perform one or more operations described herein, thereby facilitating Cell DTX/DRX interworking with LTM.

Further, example embodiments of the present disclosure may leverage the advantages of containerization in facilitating Cell DTX/DRX interworking with LTM. For instance, implementing containerized CU and/or containerized DU (or operations associated therewith) offers improved scalability, since the functionalities may be efficiently scaled according to demand and may be easily replicated and orchestrated across multiple nodes, thereby enabling efficient resource utilization and seamless scaling.

Further, the containerized CU and/or containerized DU (or operations associated therewith) may be quickly instantiated, migrated, and updated, allowing for faster time-to-market for new services and features. Furthermore, the functionalities of the CU and/or the DU may be managed by adjusting the associated containers, thereby enabling independent development, testing, and deployment of the operations.

In addition, implementing containerized CU and/or containerized DU (or operations associated therewith) may also improve resource utilization efficiency, utilize container-specific security features to improve the system security, provide improved portability and interoperability, and enable seamless integration with different systems or platforms.

Example of Implementation Environment

As described above, according to embodiments, the CU and/or the DU (or operations associated therewith) may be implemented in one or more network nodes, which may include a cloud server or a cloud server cluster. Descriptions of an example cloud environment, in which the example embodiments may be implemented, are provided below with reference to FIG. 14.

Figure 14:
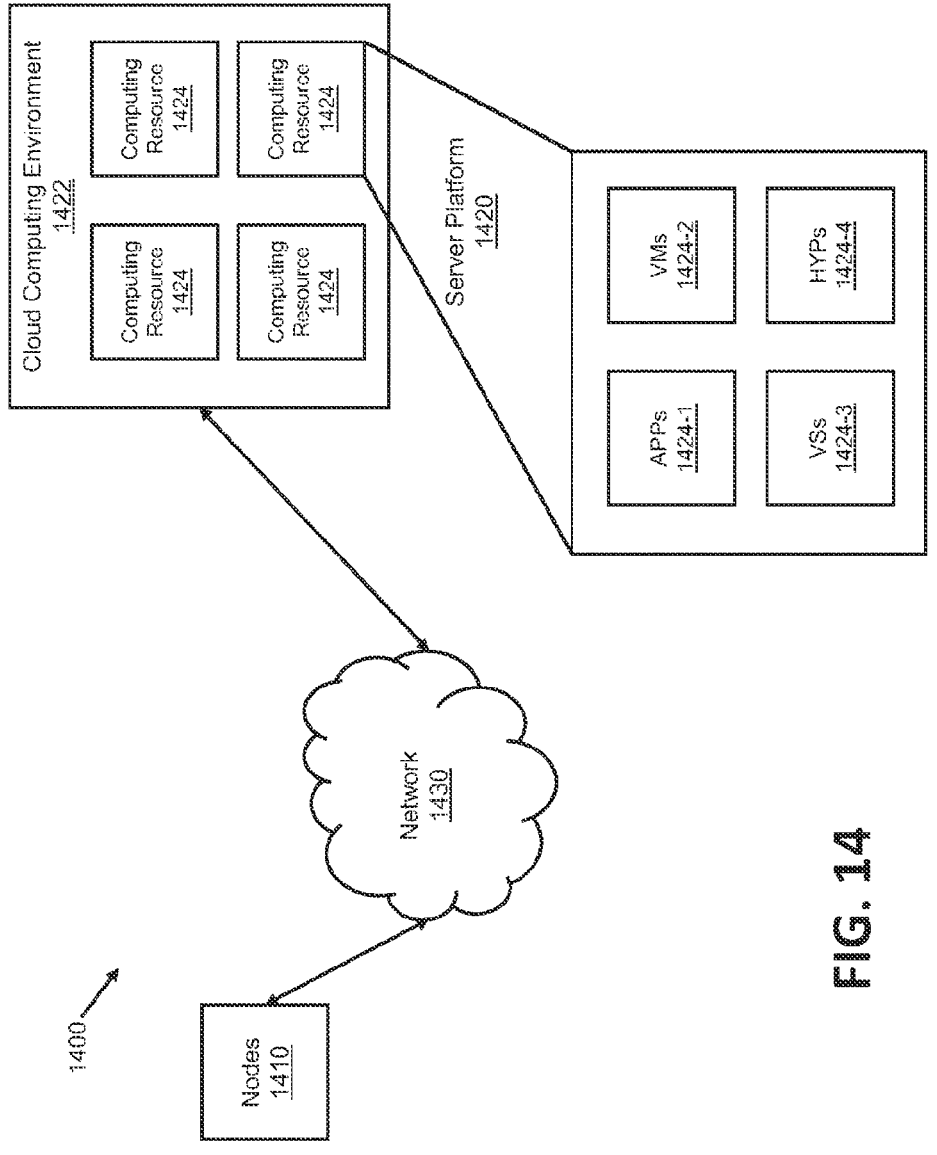
FIG. 14 illustrates a diagram of an example environment in which the systems and/or methods described herein, may be implemented.

FIG. 14 illustrates a diagram of an example environment 1400 in which the systems and/or methods described herein, may be implemented. As illustrated in FIG. 14, environment 1400 may include a plurality of nodes 1410, a server platform 1420, and a network 1430. Devices of environment 1400 may interconnect via wired connections, wireless connections, or a combination of wired and wireless connections.

The plurality of nodes 1410 may include one or more UEs and/or one or more network cells described hereinabove. Thus, redundant descriptions associated therewith may be omitted below for conciseness.

The network 1430 may include one or more wired and/or wireless networks. For example, the network 1430 may include a cellular network (e.g., a fifth generation (5G) network, a sixth generation (6G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks. Additionally or alternatively, the network 1430 may be implemented as one or more of various types of networks, such as intranet or Local Area Network (LAN), Closed Area Network (CAN), and the like. Further, the network 1430 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), and the like, to communicate with each other. Further, the network 1430 may include a variety of network devices, including routers, bridges, servers, computing devices, storage devices, and the like.

The server platform 1420 may include one or more servers capable of receiving, generating, storing, processing, and/or providing information. According to embodiments, the server platform 140 may include one or more network nodes described above with reference to FIG. 12 and FIG. 13. In some implementations, server platform 1420 may include a cloud server or a group of cloud servers.

In some implementations, the server platform 1420 may be designed to be modular such that certain software components may be swapped in or out depending on a particular need. As such, the server platform 1420 may be easily and/or quickly reconfigured for different uses.

In some implementations, as shown, the server platform 1420 may be hosted in cloud computing environment 1422. Notably, while implementations described herein describe the server platform 1420 as being hosted in cloud computing environment 1422, in some implementations, platform 1420 may not be cloud-based (i.e., may be implemented outside of a cloud computing environment) or may be partially cloud-based.

Cloud computing environment 1422 includes an environment that hosts the server platform 1420. Cloud computing environment 1422 may provide computation, software, data access, storage, and services that do not require end-user knowledge of a physical location and configuration of system(s) and/or device(s) that hosts the server platform 1420. As shown, cloud computing environment 1422 may include a group of computing resources 1424 (referred to collectively as "computing resources 1424" and individually as "computing resource 1424").

Computing resource 1424 may include one or more personal computers, a cluster of computing devices, workstation computers, server devices, or other types of computation and/or communication devices. In some implementations, the computing resource 1424 may host the server platform 1420. The cloud resources may include instances computing and executing in the computing resource 1424, storage devices provided in the computing resource 1424, data transfer devices provided by the computing resource 1424, and the like. In some implementations, the computing resource 1324 may communicate with other computing resources 1424 via wired connections, wireless connections, or a combination of wired and wireless connections.

As further shown in FIG. 14, the computing resource 1424 includes a group of cloud resources, such as one or more applications ("APPs") 1424-1, one or more virtual machines ("VMs") 1424-2, virtualized storage ("VSs") 1424-3, one or more hypervisors ("HYPs") 1424-4, or the like.

The application 1424-1 may include one or more software applications that may be provided to or accessed by the nodes 1410. The application 1424-1 may eliminate the need to install and execute the software applications on the node 1410. For example, the application 1424-1 may include software associated with the server platform 1420 and/or any other software capable of being provided via cloud computing environment 1422. In some implementations, one application 1424-1 may send/receive information to/from one or more other applications 1424-1, via virtual machine 1424-2.

The virtual machine 1424-2 may include a software implementation of a machine (e.g., a computer) that executes programs like a physical machine. Virtual machine 1424-2 may be either a system virtual machine or a process virtual machine, depending upon the use and degree of correspondence to any real machine by the virtual machine 1424-2. A system virtual machine may provide a complete system platform that supports the execution of a complete operating system ("OS"). Descriptions of examples of OS have been provided above with reference to FIG. 12. A virtual machine may execute a single program, and may support a single process. In some implementations, virtual machine 1424-2 may execute on behalf of a user (e.g., a user associated with the node(s) 1410), and may manage infrastructure and/or configuration of cloud computing environment 1422, such as data management, synchronization, or long-duration data transfers.

Virtualized storage 1424-3 may include one or more storage systems and/or one or more devices that use virtualization techniques within the storage systems or devices of computing resource 1424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1424-4 may provide hardware virtualization techniques that allow multiple operating systems (e.g., "guest operating systems") to execute concurrently on a host computer, such as computing resource 1424. The hypervisor 1424-4 may present a virtual operating platform to the guest operating systems, and may manage the execution of the guest operating systems. Multiple instances of a variety of operating systems may share virtualized hardware resources.

It is contemplated that the number and arrangement of devices and networks shown in FIG. 14 are provided as an example. In practice, there may be additional devices and/or networks, fewer devices and/or networks, different devices and/or networks, or differently arranged devices and/or networks than those shown in FIG. 14. Furthermore, two or more devices shown in FIG. 14 may be implemented within a single device, or a single device shown in FIG. 14 may be implemented as multiple, distributed devices. Additionally, or alternatively, a set of devices (e.g., one or more devices) of environment 1400 may perform one or more functions described as being performed by another set of devices of environment 1400.

According to embodiments, the CU and/or the DU (or one or more operations associated therewith) described herein may be implemented or be deployed in the server platform 1420 described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the CU and/or the DU (or one or more operations associated therewith) may be defined or presented in the form of a containerized network function, of which the functions may be provided in the form of containers. Descriptions of an example implementation configuration for implementing the (or operations associated therewith) in the form of a containerized function have been provided above with reference to FIG. 13.

To this end, by virtualizing and implementing the CU and/or the DU (or operations associated therewith) in the server platform 1420, the resources (e.g., processing power, memory, storage, etc.) for facilitating the Cell DTX/DRX interworking with LTM may be easily managed and be dynamically scaled up or scaled down on demand, which in turn optimize the resource allocation and utilization. Furthermore, said data and information associated with the CU and/or the DU may be easily cloned or backed up to provide redundancy, and the access of said data and information may be authorized and authenticated to a trusted entity only.

Various Aspects of Embodiments

It is contemplated that the example embodiments described hereinabove with reference to FIG. 2 to FIG. 14 are merely examples of possible embodiments of the present disclosure, and are not intended to limit or restrict the scope of the present disclosure.

Specifically, the foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a device (e.g., network node, etc.), a system, a method, and/or a computer-readable medium at any possible technical detail level of integration. Further, one or more of the above components described above may be implemented as instructions stored on a computer-readable medium and executable by at least one processor (and/or may include at least one processor). The computer-readable medium may include a computer-readable non-transitory storage medium (or media) having computer-readable program instructions thereon for causing a processor to carry out operations.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), electrically erasable programmable read-only memory (EEPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages.

The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limited to the implementations. Thus, the operation and behavior of the systems and/or methods were described herein without reference to specific software code—it is understood that software and hardware may be designed to implement the systems and/or methods based on the description herein.

In view of the above, various further respective aspects and features of embodiments of the present disclosure may be defined by the following items:

Item [1]: A system including a serving distributed unit (DU). The DU may be configured to: add at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell; provide, to at least one user equipment (UE), information of the at least one added active duration; and provide, to the at least one UE during the at least one added active duration, a Media Access Control (MAC) Control Element (CE). The MAC CE, transmitted during the at least one added active duration, may include a cell switch command that instructs the at least one UE to perform an LTM cell switch from the serving cell to a target cell.

Item [2]: The system according to item [1], wherein the serving DU may be configured to add the at least one active duration by: receiving, from the at least one UE, an L1 measurement; predicting, based on the L1 measurement, a timing of the LTM cell switch during a non-active duration; selecting, from a plurality of predefined active duration factors based on the L1 measurement, an active duration factor corresponding to the predicted timing, wherein each of the predefined active duration factors may be a respective factor of an existing active duration; and adding, based on the selected active duration factor, a plurality of active durations to execute an LTM cell switch.

Item [3]: The system according to item [1], wherein the serving DU may be configured to add the at least one active duration by: receiving, from the at least one UE, an L1 measurement; predicting, based on the L1 measurement, a timing at which the LTM cell switch is expected; and adding, based on the predicted timing at which the LTM cell switch is expected, an active duration to the at least on Cell DTX/DRX cycle to accommodate a timing at which the cell switch command is required to be transmitted to the at least one UE.

Item [4]: The system according to any one of items [1]-[3], wherein the target cell may be a primary target cell and the LTM cell switch may be a first LTM cell switch. The serving DU may be further configured to: provide, to the at least one UE, LTM fallback configuration, wherein the LTM fallback configuration may include configuration of a secondary target cell different from the primary target cell. The LTM fallback configuration may be utilized by the UE to perform a second LTM cell switch from the serving cell to the secondary target cell autonomously without a cell switch command from the serving DU, when the first LTM cell switch is unsuccessful and an LTM failure recovery is attempted.

Item [5]: The system according to any one of items [1]-[4], wherein the serving DU may be configured to provide the information of the at least one added active duration by providing, to a plurality of LTM configured UEs connected to the serving cell, the information of the at least one added active duration, and wherein the serving DU may be configured to provide the MAC CE by transmitting, to the plurality of LTM configured UEs during the at least one added active duration, the MAC CE.

Item [6]: The system according to any one of items [2], [4], and [5], wherein the system may further include a central unit (CU) communicatively coupled to the serving DU and the at least one UE. The serving DU may be configured to provide the information of the at least one added active duration by providing, to the CU via F1 interface, the active duration factor. The CU may be configured to: generate a Radio Resource Control (RRC) Reconfiguration message including the active duration factor and configuration of the target cell; and provide, to the at least one UE, the RRC Reconfiguration message.

Item [7]: The system according to any one of items [3]-[5], wherein the MAC CE that include the cell switch command may be a second MAC CE, and wherein the serving DU may be configured to provide the information of the at least one added active duration by: generating a first MAC CE including the information of the timing at which the LTM cell switch is expected; and providing, to the at least one UE prior to the at least one added active duration, the first MAC CE. The first MAC CE may be different from the second MAC CE.

Item [8]: The system according to item [6], wherein the serving DU may be further configured to: generate an LTM Radio Network Temporary Identifier (RNTI) specific to at least one UE configured with LTM; generate a Downlink Control Information (DCI) including information of an expected transmission time of the MAC CE; scramble, based on the LTM RNTI, the DCI; and provide, to the UE prior to the at least one added active duration, the scrambled DCI.

Item [9]: The system according to item [8], wherein the serving DU may be further configured to provide, to the CU via the F1 interface, the LTM RNTI, and wherein the CU may be configured to generate the RRC Reconfiguration message to include the LTM RNTI, the active duration factor, and the configuration of the target cell.

Item [10]: The system according to any one of items [3]-[5] and [7], wherein the L1 measurement may include a value of Reference Signal Received Power (RSRP) associated with at least one of the serving cell and one or more candidate cells. The serving DU may be configured to predict the timing at which the LTM cell switch is expected by: comparing the value of the RSRP to a predefined threshold value; based on determining that the value of the RSRP is equal to the predefined threshold value, determining that the LTM cell switch is expected at a first predefined timing in an upcoming non-active duration; and based on determining that the value of the RSRP is greater than the predefined threshold value, determining that the LTM cell switch is expected at a second predefined timing in the upcoming non-active duration.

Item [11]: The system according to according to any one of items [3]-[5] and [7], wherein the DU may be configured to predict the timing at which the LTM cell switch is expected based on at least one Artificial Intelligent (AI)/Machine Learning (ML) model.

Item [12]: A method including: adding at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell; providing, to at least one user equipment (UE), information of the at least one added active duration; providing, to the at least one UE during the at least one added active duration, a Media Access Control (MAC) Control Element (CE). The MAC CE, transmitted during the at least one added active duration, may include a cell switch command that instructs the at least one UE to perform an LTM cell switch from the serving cell to a target cell.

Item [13]: The method according to item [12], wherein the adding the at least one active duration may include: receiving, from the at least one UE, an L1 measurement; predicting, based on the L1 measurement, a timing of the LTM cell switch during a non-active duration; selecting, from a plurality of predefined active duration factors based on the L1 measurement, an active duration factor corresponding to the predicted timing, wherein each of the predefined active duration factors is a respective factor of an existing active duration; and adding, based on the selected active duration factor, a plurality of active durations to execute an LTM cell switch.

Item [14]: The method according to item [12], wherein the adding the at least one active duration may include: receiving, from the at least one UE, an L1 measurement; predicting, based on the L1 measurement, a timing at which the LTM cell switch is expected; and adding, based on the predicted timing at which the LTM cell switch is expected, an active duration to the at least one Cell DTX/DRX cycle to accommodate a timing at which the cell switch command is required to be transmitted to the at least one UE.

Item [15]: The method according to any one of items [12]-[14], wherein the target cell may be a primary target cell, and the LTM cell switch may be a first LTM cell switch. The method may further include: providing, to the at least one UE, LTM fallback configuration, wherein the LTM fallback configuration may include configuration of a secondary target cell different from the primary target cell. The LTM fallback configuration may be utilized by the at least one UE to perform a second LTM cell switch from the serving cell to the secondary target cell autonomously without a cell switch command from the serving DU, when the first LTM cell switch is unsuccessful and an LTM failure recovery is attempted.

Item [16]: The method according to any one of items [12]-[15], wherein the providing the information of the at least one added active duration may include: providing, to a plurality of LTM configured UEs connected to the serving cell, the information of the at least one added active duration; and wherein the providing the MAC CE may include transmitting, to the plurality of LTM configured UEs during the at least one added active duration, the MAC CE.

Item [17]: The method according to any one of items [13], [15], and [16], wherein the providing the information of the at least one added active duration may include: generating a Radio Resource Control (RRC) Reconfiguration message including the active duration factor and configuration of the target cell; and providing, to the UE, the RRC Reconfiguration message.

Item [18]: The method according to any one of items [14]-[16], wherein the MAC CE that includes the cell switch command may be a second MAC CE, and wherein the providing the information of the at least one added active duration may include: generating a first MAC CE including the information of the timing at which the LTM cell switch is expected; and providing, to the at least one UE prior to the at least one added active duration, the first MAC CE. The first MAC CE is different from the second MAC CE.

Item [19]: The method according to item [17], wherein the method may further include: generating an LTM Radio Network Temporary Identifier (RNTI) specific to or associated with at least one UE configured with LTM; generating a Downlink Control Information (DCI) comprising information of an expected transmission time of the MAC CE; scrambling, based on the LTM RNTI, the DCI; providing, to the UE prior to the at least one added active duration, the scrambled DCI; and generating the RRC Reconfiguration message to include the LTM RNTI, the active duration factor, and the configuration of the target cell.

Item [20]: A non-transitory computer-readable recording medium having recorded thereon instructions executable by at least one network node to cause the at least one network node to perform a method including: adding at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell; providing, to at least one user equipment (UE), information of the at least one added active duration; and providing, to the at least one UE during the at least one added active duration, a Media Access Control (MAC) Control Element (CE). The MAC CE may include a cell switch command that instructs the at least one UE to perform an LTM cell switch from the serving cell to a target cell.

Item [21]: A user equipment (UE) that may be configured to: receive, from a serving distributed unit (DU), information of at least one Layer 1 (L1)/Layer 2 (L2) Triggered Mobility (LTM)-specific active duration added by the serving DU to at least one Cell Discontinuous Transmission (DTX)/Discontinuous Reception (DRX) cycle associated with a serving cell; monitor, during the at least one added active duration, Physical Downlink Control Channel (PDCCH) to obtain a Media Access Control (MAC) Control Element (CE), wherein the MAC CE may include a cell switch command; and perform, based on the cell switch command, an LTM cell switch from the serving cell to a target cell.

Item [22]: The UE according to item [21], wherein the target cell may be a primary target cell, and the LTM cell switch may be a first LTM cell switch. The UE may be further configured to: receive, from the serving DU, LTM fallback configuration, wherein the LTM fallback configuration comprises configuration of a secondary target cell different from the target cell; determine whether or not the first LTM cell switch is successful; and based on determining that the first LTM cell switch is unsuccessful, perform, based on the LTM fallback configuration, a second LTM cell switch from the serving cell to the secondary target cell, without a cell switch command from the serving DU.

Item [23]: The UE according to any one of items [21]-[22], wherein the information of the at least one added active duration may include an active duration factor, and wherein the active duration factor may be a factor of an existing active duration. The UE may be configured to receive the information of at least one added active duration by: receiving, from a central unit (CU) communicatively coupled to the serving DU, a Radio Resource Control (RRC) Reconfiguration message including the active duration factor; and obtaining, from the RRC Reconfiguration message, the active duration factor.

Item [24]: The UE according to any one of items [21]-[22], wherein the MAC CE that includes the cell switch command may be a second MAC CE, and the information of the at least one added active duration may include information of a timing at which the LTM cell switch is expected. The UE may be configured to receive the information of at least one added active duration by: receiving, from the serving DU prior to the at least one added active duration, a first MAC CE, wherein the first MAC CE may include information of the timing at which the LTM cell switch is expected, and wherein the first MAC CE may be different from the second MAC CE.

Item [25]: The UE according to item [23], wherein the UE may be configured to monitor the PDCCH by: monitoring, during a plurality of active durations added by the serving DU, the PDCCH to receive the MAC CE therefrom.

Item [26]: The UE according to item [24], wherein the UE may be configured to monitor the PDCCH by: monitoring, during an added active duration that accommodates the timing at which the LTM cell switch is expected, the PDCCH to receive the MAC CE therefrom.

Item [27]: The UE according to item [22], wherein the UE may be further configured to: based on determining that the first LTM cell switch is successful, provide, to a central unit (CU), an RRC Reconfiguration Acknowledge message.

Item [28]: A method including: receiving, from a serving distributed unit (DU), information of at least one active duration added by the serving DU to at least one Cell Discontinuous Transmission (DTX)/Discontinuous Reception (DRX) cycle associated with a serving cell; monitoring, during the at least one added active duration, Physical Downlink Control Channel (PDCCH) to obtain a Media Access Control (MAC) Control Element (CE), wherein the MAC CE may include a cell switch command; and performing, based on the cell switch command, a Layer 1 (L1)/Layer 2 (L2) Triggered Mobility (LTM) cell switch from the serving cell to a target cell.

Item [29]: The method according to item [28], wherein the target cell may be a primary target cell, and the LTM cell switch may be a first LTM cell switch. The method may further include: receiving, from the serving DU, LTM fallback configuration, wherein the LTM fallback configuration may include configuration of a secondary target cell different from the primary target cell; determining whether or not the first LTM cell switch is successful; and based on determining that the first LTM cell switch is unsuccessful, performing, based on the LTM fallback configuration, a second LTM cell switch from the serving cell to the secondary target cell, without a cell switch command from the serving DU.

Item [30]: The method according to any one of items [28]-[29], wherein the information of the at least one added active duration may include an active duration factor, and wherein the active duration factor may be a factor of an existing active duration. The receiving the information of at least one added active duration may include: receiving, from a central unit (CU) communicatively coupled to the serving DU, a Radio Resource Control (RRC) Reconfiguration message including the active duration factor; and obtaining, from the RRC Reconfiguration message, the active duration factor.

Item [31]: The method according to any one of items [28]-[29], wherein the MAC CE that includes the cell switch command may be a second MAC CE, wherein the information of the at least one added active duration may include information of a timing at which the LTM cell switch is expected, wherein the receiving the information of at least one added active duration may include: receiving, from the serving DU prior to the at least one added active duration, a first MAC CE. The first MAC CE may include information of the timing at which the LTM cell switch is expected, and the first MAC CE may be different from the second MAC CE.

Item [32]: The method according to item [30], wherein the monitoring the PDCCH may include: monitoring, during a plurality of active durations added by the serving DU, the PDCCH.

Item [33]: The method according to item [31], wherein the monitoring the PDCCH may include: monitoring, during an added active duration that accommodates the timing at which the LTM cell switch is expected, the PDCCH.

Item [34]: The method according to item [29], wherein the method may further include: based on determining that the first LTM cell switch is successful, providing, to a central unit (CU), an RRC Reconfiguration Acknowledge message.

Item [35]: A non-transitory computer-readable recording medium having recorded thereon instructions executable by a user equipment (UE) to cause the UE to perform a method including: receiving, from a serving distributed unit (DU), information of at least one active duration added by the serving DU to at least one Cell Discontinuous Transmission (DTX)/Discontinuous Reception (DRX) cycle associated with a serving cell; monitoring, during the at least one added active duration, Physical Downlink Control Channel (PDCCH) to obtain a Media Access Control (MAC) Control Element (CE), wherein the MAC CE may include a cell switch command; and performing, based on the cell switch command, a Layer 1 (L1)/Layer 2 (L2) Triggered Mobility (LTM) cell switch from the serving cell to a target cell.

Item [36]: The non-transitory computer-readable recording medium according to item [35], wherein the target cell may be a primary target cell, and the LTM cell switch may be a first LTM cell switch, and wherein the method may further include: receiving, from the serving DU, LTM fallback configuration, wherein the LTM fallback configuration may include configuration of a secondary target cell different from the primary target cell; determining whether or not the first LTM cell switch is successful; and based on determining that the first LTM cell switch is unsuccessful, performing, based on the LTM fallback configuration, a second LTM cell switch from the serving cell to the secondary target cell, without a cell switch command from the serving DU.

Item [37]: The non-transitory computer-readable recording medium according to any one of items [35]-[36], wherein the information of the at least one added active duration may include an active duration factor, wherein the active duration factor may be a factor of an existing active duration in the at least one Cell DTX/DRX cycle, and wherein the receiving the information of at least one added active duration may include: receiving, from a central unit (CU) communicatively coupled to the serving DU, a Radio Resource Control (RRC) Reconfiguration message including the active duration factor; and obtaining, from the RRC Reconfiguration message, the active duration factor.

Item [38]: The non-transitory computer-readable recording medium according to any one of items [35]-[36], wherein the MAC CE that includes the cell switch command may be a second MAC CE, wherein the receiving the information of at least one added active duration may include: receiving, from the serving DU prior to the at least one added active duration, a first MAC CE. The first MAC CE may include information of the at least one added active duration, and the first MAC CE may be different from the second MAC CE.

Item [39]: The non-transitory computer-readable recording medium according to item [37], wherein the monitoring the PDCCH may include: monitoring, during a plurality of active durations added by the serving DU, the PDCCH.

Item [40]: The non-transitory computer-readable recording medium according to item [38], wherein the monitoring the PDCCH may include: monitoring, during an added active duration that accommodates the timing at which the LTM cell switch is expected, the PDCCH.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:

a serving distributed unit (DU) configured to:

add at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell;

provide, to at least one user equipment (UE), information of the at least one added active duration; and provide, to the at least one UE during the at least one added active duration, a Media Access Control (MAC) Control Element (CE), wherein the MAC CE comprises a cell switch command that instructs the at least one UE to perform an LTM cell switch from the serving cell to a target cell.

2. The system according to claim 1, wherein the serving DU is configured to add the at least one active duration by:

receiving, from the at least one UE, an L1 measurement;

predicting, based on the L1 measurement, a timing of the LTM cell switch during a non-active duration;

selecting, from a plurality of predefined active duration factors based on the L1 measurement, an active duration factor corresponding to the predicted timing, wherein each of the predefined active duration factors is a respective factor of an existing active duration; and adding, based on the selected active duration factor, a plurality of active durations.

3. The system according to claim 2, further comprising:

a central unit (CU) communicatively coupled to the serving DU and the at least one UE, wherein the serving DU is configured to provide the information of the at least one added active duration by:

providing, to the CU via F1 interface, the active duration factor;

wherein the CU is configured to:

generate a Radio Resource Control (RRC) Reconfiguration message comprising the active duration factor and configuration of the target cell; and provide, to the at least one UE, the RRC Reconfiguration message.

4. The system according to claim 3, wherein the serving DU is further configured to:

generate an LTM Radio Network Temporary Identifier (RNTI) specific to at least one UE configured with LTM;

generate a Downlink Control Information (DCI) comprising information of an expected transmission time of the MAC CE;

scramble, based on the LTM RNTI, the DCI; and provide, to the UE prior to the at least one added active duration, the scrambled DCI.

5. The system according to claim 4, wherein the serving DU is further configured to provide, to the CU via the F1 interface, the LTM RNTI; and wherein the CU is configured to generate the RRC Reconfiguration message to include the LTM RNTI, the active duration factor, and the configuration of the target cell.

6. The system according to claim 1, wherein the serving DU is configured to add the at least one active duration by:

receiving, from the at least one UE, an L1 measurement;

predicting, based on the L1 measurement, a timing at which the LTM cell switch is expected; and adding, based on the timing at which the LTM cell switch is expected, an active duration to the at least one Cell DTX/DRX cycle to accommodate a timing at which the cell switch command is required to be transmitted to the at least one UE.

7. The system according to claim 6, wherein the MAC CE that comprises the cell switch command is a second MAC CE, and wherein the serving DU is configured to provide the information of the at least one added active duration by:

generating a first MAC CE comprising the information of the timing at which the LTM cell switch is expected; and providing, to the at least one UE prior to the at least one added active duration, the first MAC CE, wherein the first MAC CE is different from the second MAC CE.

8. The system according to claim 6, wherein the L1 measurement comprises a value of Reference Signal Received Power (RSRP) associated with the at least one of the serving cell and one or more candidate cells, wherein the serving DU is configured to predict the timing at which the LTM cell switch is expected by:

comparing the value of the RSRP to a predefined threshold value;

based on determining that the value of the RSRP is equal to the predefined threshold value, determining that the LTM cell switch is expected at a first predefined timing in an upcoming non-active duration; and based on determining that the value of the RSRP is greater than the predefined threshold value, determining that the LTM cell switch is expected at a second predefined timing in the upcoming non-active duration.

9. The system according to claim 6, wherein the serving DU is configured to predict the timing at which the LTM cell switch is expected based on at least one Artificial Intelligent (AI)/Machine Learning (ML) model.

10. The system according to claim 1, wherein the target cell is a primary target cell, wherein the LTM cell switch is a first LTM cell switch, and wherein the serving DU is further configured to:

provide, to the at least one UE, LTM fallback configuration, wherein the LTM fallback configuration comprises configuration of a secondary target cell different from the primary target cell, wherein the LTM fallback configuration is utilized by the at least one UE to perform a second LTM cell switch from the serving cell to the secondary target cell autonomously without a cell switch command from the serving DU, when the first LTM cell switch is unsuccessful.

11. The system according to claim 1, wherein the serving DU is configured to provide the information of the at least one added active duration by:

providing, to a plurality of LTM configured UEs connected to the serving cell, the information of the at least one added active duration; and wherein the serving DU is configured to provide the MAC CE by:

transmitting, to the plurality of LTM configured UEs during the at least one added active duration, the MAC CE.

12. A method comprising:

adding at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell;

providing, to at least one user equipment (UE), information of the at least one added active duration; and providing, to the at least one UE during the at least one added active duration, a Media Access Control (MAC) Control Element (CE), wherein the MAC CE comprises a cell switch command that instructs the at least one UE to perform an LTM cell switch from the serving cell to a target cell.

13. The method according to claim 12, wherein the adding the at least one active duration comprises:

receiving, from the at least one UE, an L1 measurement;

predicting, based on the L1 measurement, a timing of the LTM cell switch during a non-active duration;

selecting, from a plurality of predefined active duration factors based on the L1 measurement, an active duration factor corresponding to the predicted timing, wherein each of the predefined active duration factors is a respective factor of an existing active duration; and adding, based on the selected active duration factor, a plurality of active durations.

14. The method according to claim 13, wherein the providing the information of the at least one added active duration comprises:

generating a Radio Resource Control (RRC) Reconfiguration message comprising the active duration factor and configuration of the target cell; and providing, to the at least one UE, the RRC Reconfiguration message.

15. The method according to claim 14, further comprising:

generating an LTM Radio Network Temporary Identifier (RNTI) specific to at least one UE configured with LTM;

generating a Downlink Control Information (DCI) comprising information of an expected transmission time of the MAC CE;

scrambling, based on the LTM RNTI, the DCI;

providing, to the UE prior to the at least one added active duration, the scrambled DCI; and generating the RRC Reconfiguration message to include the LTM RNTI, the active duration factor, and the configuration of the target cell.

16. The method according to claim 12, wherein the adding the at least one active duration comprises:

receiving, from the at least one UE, an L1 measurement;

predicting, based on the L1 measurement, a timing at which the LTM cell switch is expected; and adding, based on the timing at which the LTM cell switch is expected, an active duration to the at least one Cell DTX/DRX cycle to accommodate a timing at which the cell switch command is required to be transmitted to the at least one UE.

17. The method according to claim 16, wherein the MAC CE that comprises the cell switch command is a second MAC CE, and wherein the providing the information of the at least one added active duration comprises:

generating a first MAC CE comprising the information of the timing at which the LTM cell switch is expected; and providing, to the at least one UE prior to the at least one added active duration, the first MAC CE, wherein the first MAC CE is different from the second MAC CE.

18. The method according to claim 12, wherein the target cell is a primary target cell, wherein the LTM cell switch is a first LTM cell switch, and wherein the method further comprises:

providing, to the at least one UE, LTM fallback configuration, wherein the LTM fallback configuration comprises configuration of a secondary target cell different from the primary target cell, wherein the LTM fallback configuration is utilized by the at least one UE to perform a second LTM cell switch from the serving cell to the secondary target cell autonomously without a cell switch command, when the first LTM cell switch is unsuccessful.

19. The method according to claim 12, wherein the providing the information of the at least one added active duration comprises:

providing, to a plurality of LTM configured UEs connected to the serving cell, the information of the at least one added active duration; and wherein the providing the MAC CE comprises:

transmitting, to the plurality of LTM configured UEs during the at least one added active duration, the MAC CE.

20. A non-transitory computer-readable recording medium having recorded thereon instructions executable by at least one network node to cause the at least one network node to perform a method comprising:

adding at least one Layer 1 (L1)/Layer 2 (L2) Triggered Mobility (LTM)-specific active duration to at least one Cell Discontinuous Transmission (DTX)/Discontinuous Reception (DRX) cycle associated with a serving cell;

providing, to at least one user equipment (UE), information of the at least one added active duration; and providing, to the at least one UE during the at least one added active duration, a Media Access Control (MAC) Control Element (CE), wherein the MAC CE comprises a cell switch command that instructs the at least one UE to perform an LTM cell switch from the serving cell to a target cell.

* * * * *